US008386358B1

(12) United States Patent  
Aiken

(10) Patent No.: US 8,386,358 B1
(45) Date of Patent: Feb. 26, 2013

(54) APPARATUSES, METHODS AND SYSTEMS FOR A RISK-ADJUSTED RETURN MAXIMIZING INVESTMENT STRUCTURE

(75) Inventor: Joe Aiken, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/192,986

(22) Filed: Jul. 28, 2011

Related U.S. Application Data

(60) Provisional application No. 61/369,405, filed on Jul. 30, 2010, provisional application No. 61/474,780, filed on Apr. 13, 2011.

(51) Int. Cl.
*G06Q 40/00* (2012.01)
(52) U.S. Cl. ........................................ 705/36 R; 705/35
(58) Field of Classification Search ........................ None
See application file for complete search history.

(56) References Cited

U.S. PATENT DOCUMENTS

| | | | |
|---|---|---|---|
| 7,958,033 B2 * | 6/2011 | Wardley et al. | 705/35 |
| 8,175,949 B2 * | 5/2012 | Drouin | 705/36 R |
| 8,195,543 B2 * | 6/2012 | Palma et al. | 705/35 |
| 8,198,543 B2 * | 6/2012 | Kang et al. | 174/254 |
| 2009/0006274 A1 * | 1/2009 | Levin et al. | 705/36 R |
| 2009/0119200 A1 * | 5/2009 | Riviere | 705/37 |
| 2009/0119230 A1 * | 5/2009 | Levin et al. | 705/36 R |
| 2009/0248561 A1 * | 10/2009 | McIntosh | 705/35 |

OTHER PUBLICATIONS

Buyer's Guide to Managing Price Risk; Chicago Board of Trade; 1996; 44-pages.*
Buyer's Guide to Managing Price Risk; Chicago Board of Trade; 1996; 44-p.*
Futures expiration, contract switching, and price discovery; Chatrath, Arjun; Christie-David, Rohan; Journal of Derivatives, 12, 1,58(15); Fall 2004; 26-pages.*
Agricultural Trade Leads; Journal of Commerce; May 22, 1996; 13-pages.*

* cited by examiner

*Primary Examiner* — Olabode Akintola
(74) *Attorney, Agent, or Firm* — Perkins Coie LLP

(57) ABSTRACT

The APPARATUSES, METHODS AND SYSTEMS FOR A RISK-ADJUSTED RETURN MAXIMIZING INVESTMENT STRUCTURE ("RAR-MAX") transform market data, client's investment request inputs, and/or the like via RAR-MAX components into transaction record, investment return outputs, and/or the like). A method is disclosed, comprising: formulating a portfolio of a plurality of contract positions; determining hedge roll dates for each contract position in the portfolio; determining a first expiring financial instrument on a first hedge roll date; determining a first plurality of parameters for a first new financial instrument; rolling the first expiring financial instrument to the first new financial instrument associated with the determined first plurality of rollover parameters on the first hedge roll date; determining a second expiring financial instrument on a second hedge roll date; determining a second plurality of parameters for a second new financial instrument; and rolling the second expiring financial instrument to the second new financial instrument associated with the determined second plurality of rollover parameters on the second hedge roll date.

19 Claims, 16 Drawing Sheets

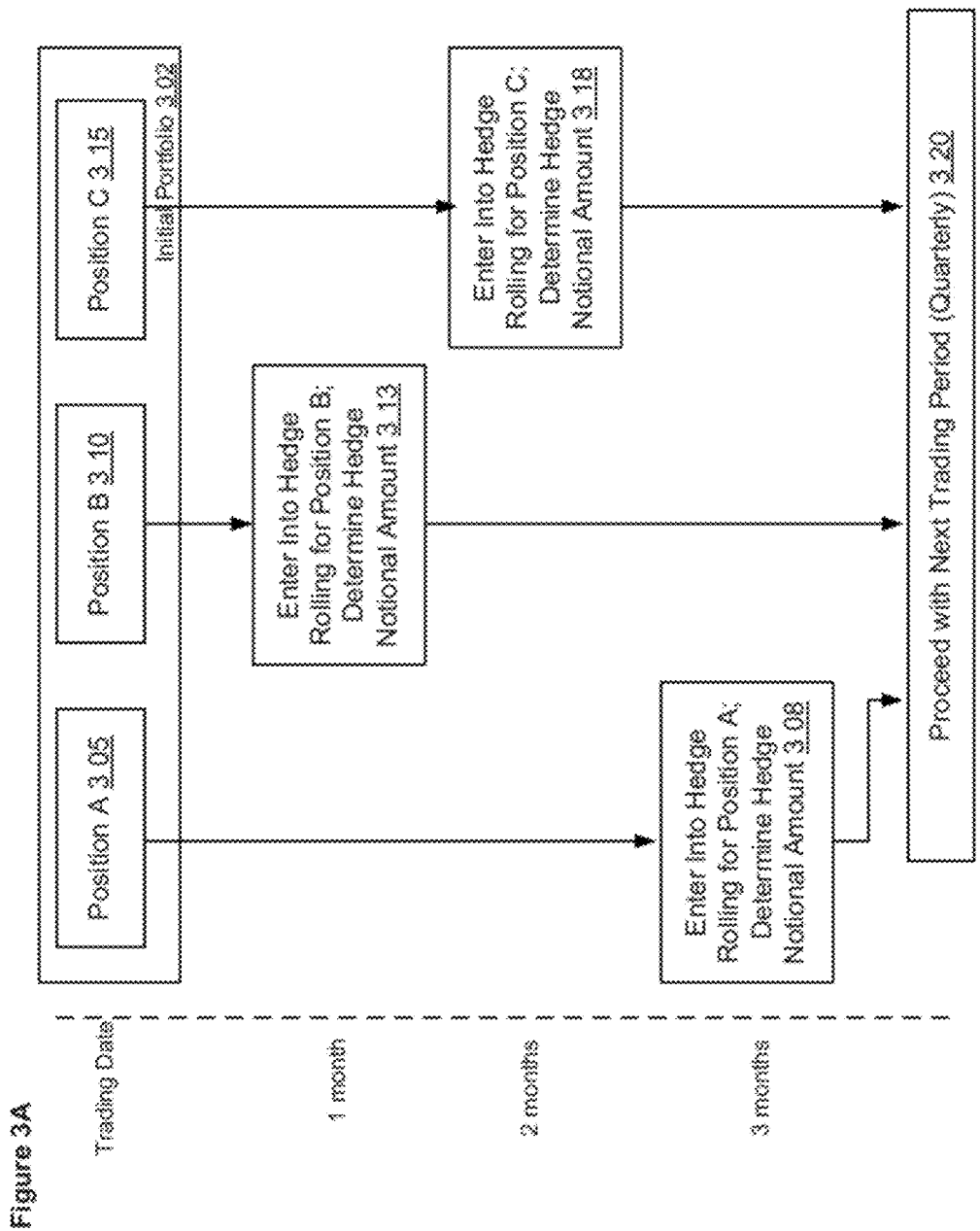

Graph I. Example VIX Level

Graph II. Example Average VIX Futures Curve

Graph I. Example Performance of Rolling Nearby Futures vs. RAR-MAX Volatility Strategy Graph II. Example 3-Month Rolling Average Contract

Figure 4D

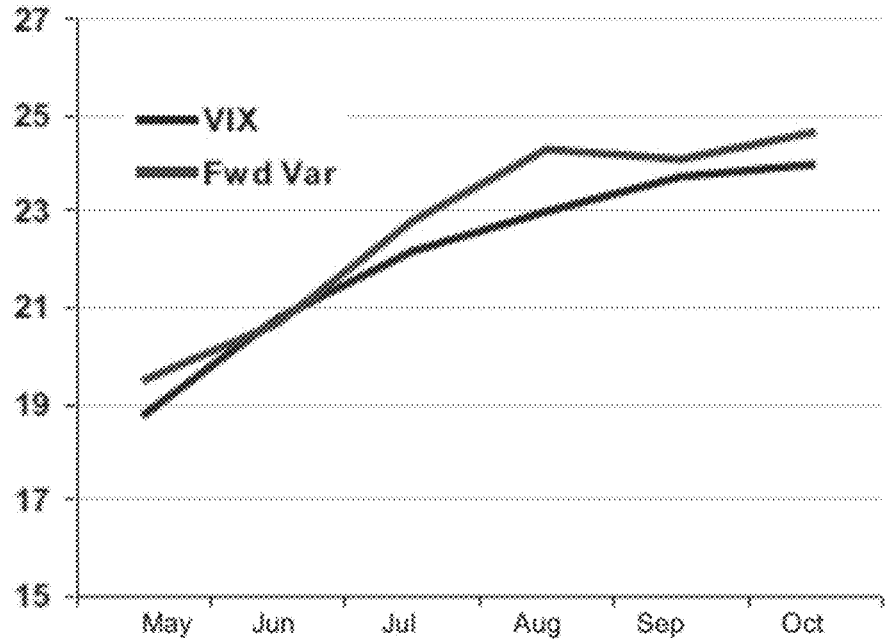

Graph I. Example Term Structure

| Calendar / Business Day Adjustment | $\sigma_{wd} = \sqrt{\sigma_{biz}^2 * \frac{30}{365.2425} * \frac{252}{\#bizDays}}$ |
| --- | --- |
| Wednesday / Friday Adjustment | $\sigma_{wd} = \sqrt{\frac{2*\sigma_{t-1}^2 + \#daysContract_t * \sigma_t^2}{2 + \#daysContract_t}}$ |
| Convexity | $\sigma_{wd} = \sigma_{wd} - \frac{\text{var}[\sigma_{wd}^2]}{8[\sigma_{wd}^2]^{\frac{3}{2}}}$ |

Graph II. Adjustments for Converting a VIX Future to Variance

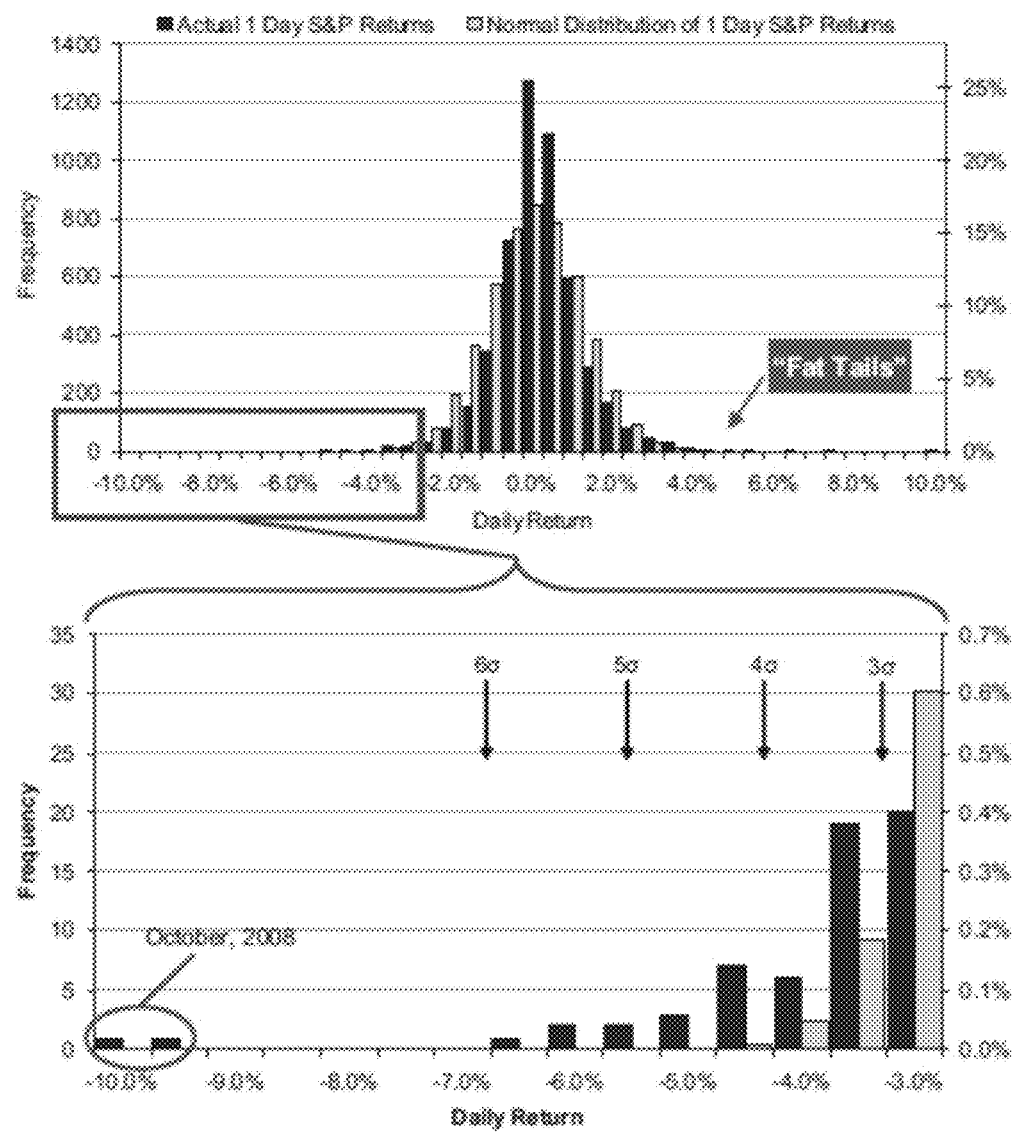

| Strategy | SPXTR | EBX |
|---|---|---|
| Annualized Return | 5.79% | 7.10% |
| Annualized Standard Deviation of Daily Returns | 21.08% | 11.80% |
| Sharpe Ratio | 0.27 | 0.60 |
| Max Drawdown | -55.25% | -27.61% |
| Annualized Return / Max Drawdown | 0.54 | 3.00 |

US 8,386,358 B1

APPARATUSES, METHODS AND SYSTEMS FOR A RISK-ADJUSTED RETURN MAXIMIZING INVESTMENT STRUCTURE

PRIORITY CLAIM

Applicant hereby claims priority under 35 USC §119 for U.S. provisional patent application Ser. No. 61/369,405, filed Jul. 30, 2010, and U.S. provisional patent application Ser. No. 61/474,780, filed Apr. 13, 2011, both entitled "Apparatuses, Methods And Systems For A Risk-Adjusted Return Maximizing Investment Structure." The entire contents of the aforementioned application are herein expressly incorporated by reference.

FIELD

The present invention is directed generally to apparatuses, methods, and systems for financial investment procedures, and more particularly, to APPARATUSES, METHODS AND SYSTEMS FOR A RISK-ADJUSTED RETURN MAXIMIZING INVESTMENT STRUCTURE.

BACKGROUND

Different financial instruments have been utilized to provide investment options to investors. For example, bonds, forward contracts, futures, options, swaps and/or the like can be constructed to satisfy different investment objectives of investors. Investors may be interested in investing in different asset classes.

BRIEF DESCRIPTION OF THE DRAWINGS

The accompanying appendices and/or drawings illustrate various non-limiting, example, inventive aspects in accordance with the present disclosure:

FIGS. 3A-3B are of logic flow diagrams illustrating equity exposure procedure in some embodiments of the RAR-MAX;

FIGS. 4A-4F provide data diagrams illustrating example performance of the volatility hedging procedures in some embodiments of the RAR-MAX;

FIGS. 5A-5C provide data diagrams illustrating example performance of the equity exposure procedure in some embodiments of the RAR-MAX.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

RAR-MAX

The RISK-ADJUSTED RETURN MAXIMIZING INVESTMENT STRUCTURE (hereinafter "RAR-MAX") provides investment structures and strategies to maximize risk-adjusted returns for investors. In one embodiment, the RAR-MAX may obtain historical data with regard to equity implied volatility of the equity market and analyze equity implied volatility to devise a volatility strategy for tail risk hedging. For example, the RAR-MAX may develop a proprietary procedure to optimize the selection of the purchased contract by an investor to minimize exposure to the steep nature of the volatility term structure. In an alternative embodiment, the RAR-MAX may adopt a long total return swap and a portfolio of put spread collars to achieve equity-like returns.

Figure 1A:
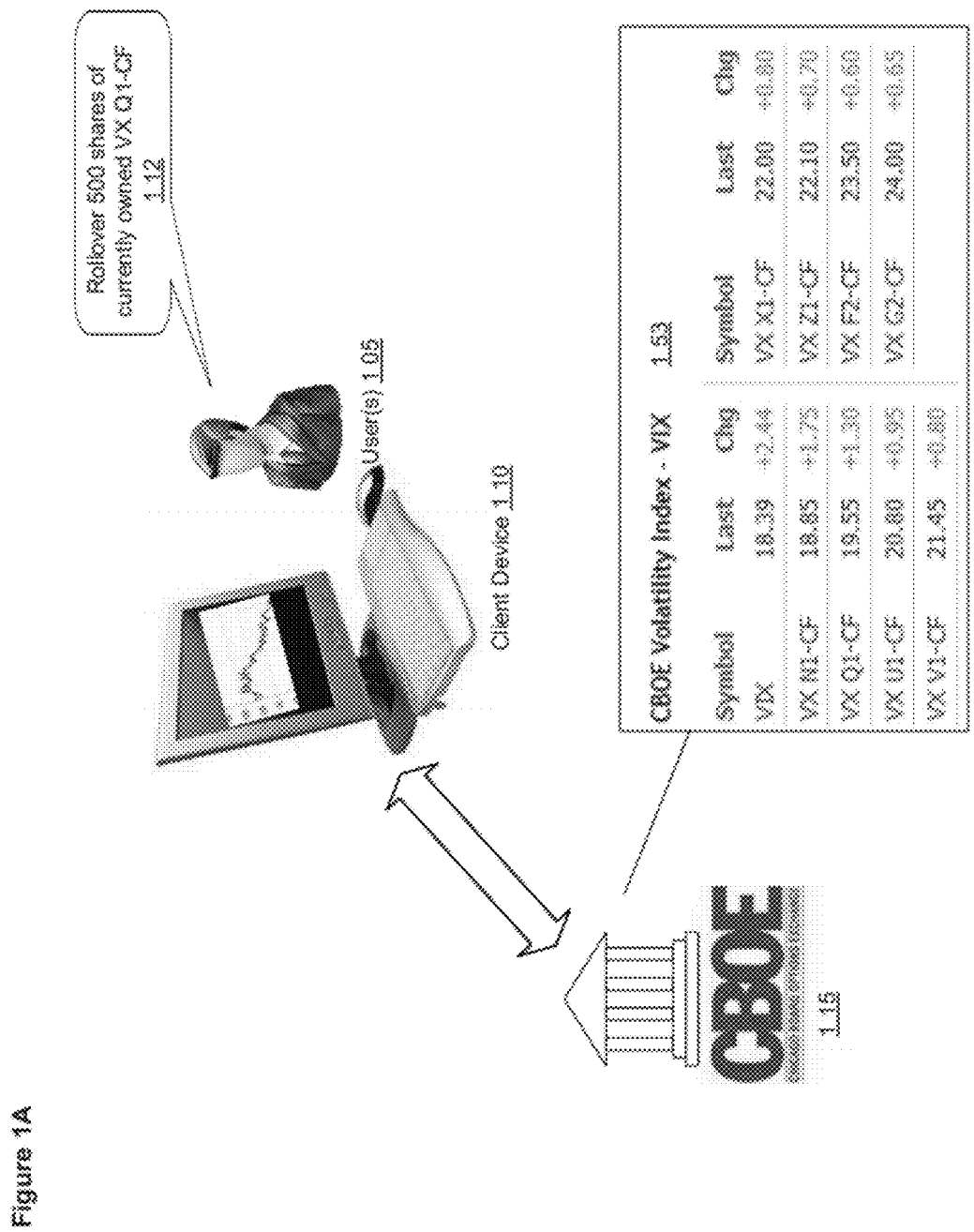
FIGS. 1A-1B are of a block diagrams illustrating data flows between the RAR-MAX and its affiliated entities within some embodiments of the RAR-MAX.

FIG. 1A provides a block diagram illustrating an example of volatility based risk hedging within embodiments of the RAR-MAX. In one implementation, a user 105, who may be an investor, a trader, an asset manager, and/or the like, may operate a client device 110 (e.g., a laptop computer, a desktop computer, a Personal Digital Assistant (PDA), etc.) to receive information of real-time market trading information from, and/or submit an order of a proposed trade to, a public trading platform 115. For example, the user 105 may view a list of volatility index 153 obtained from Chicago Board Options Exchange (CBOE) and submit a proposed transaction to "rollover 500 shares of currently owned VX Q1-CF" 112 upon analysis based on the portfolio and the volatility index.

Figure 1B:
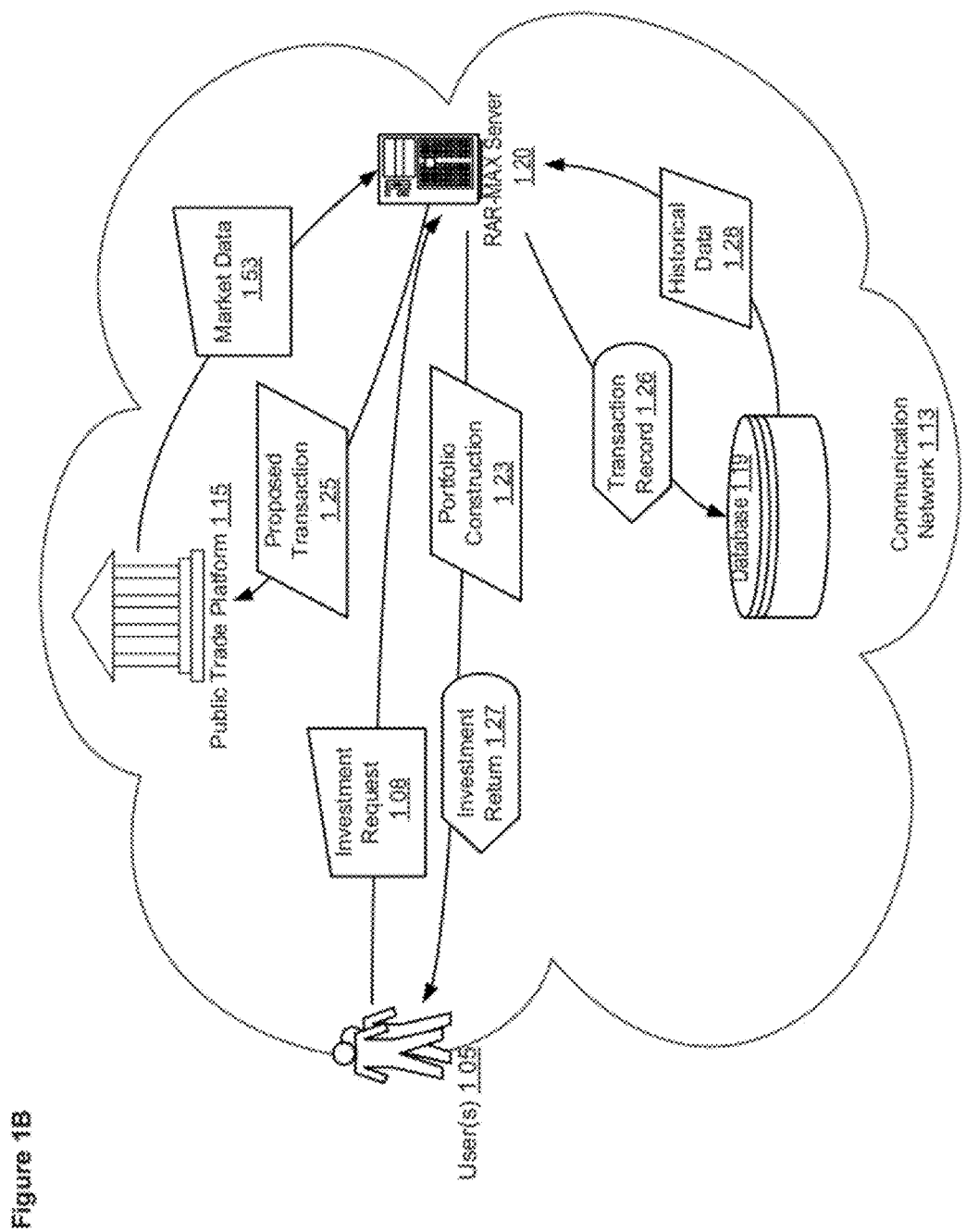

FIG. 1B provides a block diagram illustrating data flows between the RAR-MAX and the affiliated entities within embodiments of the RAR-MAX. In one embodiment, a user 105, a RAR-MAX server 120, a public trade platform 115, and/or a RAR-MAX database 119 may interact to exchange financial data via a communication network 113.

In some embodiments, a user may submit an investment request 108 to the RAR-MAX server 120. In one implementation, the RAR-MAX server 120 may comprise a wide variety of different devices and technologies such as, but not limited to, mobile devices, laptop computers, desktop computers, work stations, and/or the like. In one implementation, the RAR-MAX server may be housed remotely to the user 105, wherein the user 105 may operate a personal device (e.g., a mobile device, a personal computer, etc.) to exchange data with the RAR-MAX server. In another implementation, the RAR-MAX server may be housed within a location of the user, who may directly interact with and/or operate the RAR-MAX server/apparatus.

In some embodiments, the RAR-MAX server 120 may receive market data 153 from a public trade platform 115, such as, but not limited to Dow Jones Industry Average (DJIA), S&P 500 Index, Nasdaq Composite Index, S&P/TSX Composite Index, and/or the like. In one implementation, the public trade platform 115 may comprise a stock exchange platform, such as New York Stock Exchange, Chicago Board Options Exchange, and/or the like. In another implementation, the public trade platform 115 may comprise a market data center, such as Bloomberg, Nasdaq OMX, NYSE Euronext, Capital Market Daily, and/or the like.

In one implementation, the RAR-MAX server 120 may analyze market data and the user's investment request 108 to submit a proposed transaction 125 to the public trading platform 115 for execution. For example, the user 105 may make an order via the RAR-MAX server, which may in turn generate a HTTPS message to the trading floor.

In some implementations, the RAR-MAX server 120 may return a proposed portfolio construction 123 to the user 105, and may monitor the investment return 127 for the user.

In one embodiment, the RAR-MAX server may communicate with a RAR-MAX database 119. In some embodiments, distributed RAR-MAX databases may be integrated in-house with the RAR-MAX server 120. In additional or alternative embodiments, the RAR-MAX server 120 may access a remote RAR-MAX database 119 via the communication network 113. In one embodiment, the RAR-MAX server may send data to the database 119 for storage, such as, but not limited to market data history, transaction record, user investment portfolio data, and/or the like.

In one embodiment, the RAR-MAX database 119 may be one or more online database connected to a variety of data platforms, such as a public trading platform, a market data center, and/or the like, and obtain updated market data information, real-time trade information, and/or the like from such data platforms. In another embodiment, the RAR-MAX server may constantly, intermittently, and/or periodically obtain historical data from the database 119 for investment portfolio analysis.

For example, in one implementation, an example eXtensible Markup Language (XML) record of a transaction may take a form similar to the following:
<Transaction>
<TransactionID>123456789</TranactionID>
  <TransactionTime>09:10:23 06-06-2000</TransactionTime>
  <TRansactedInstrument>
    <Name> VX Q1-CF </Name>
    <Index> 19.55 </Index>
    . . .
  </TransactedInstrument>
  <Volume> 500</Volume>
  <Type> rollover </Type>
  . . .
</Transaction>

Figure 2A:
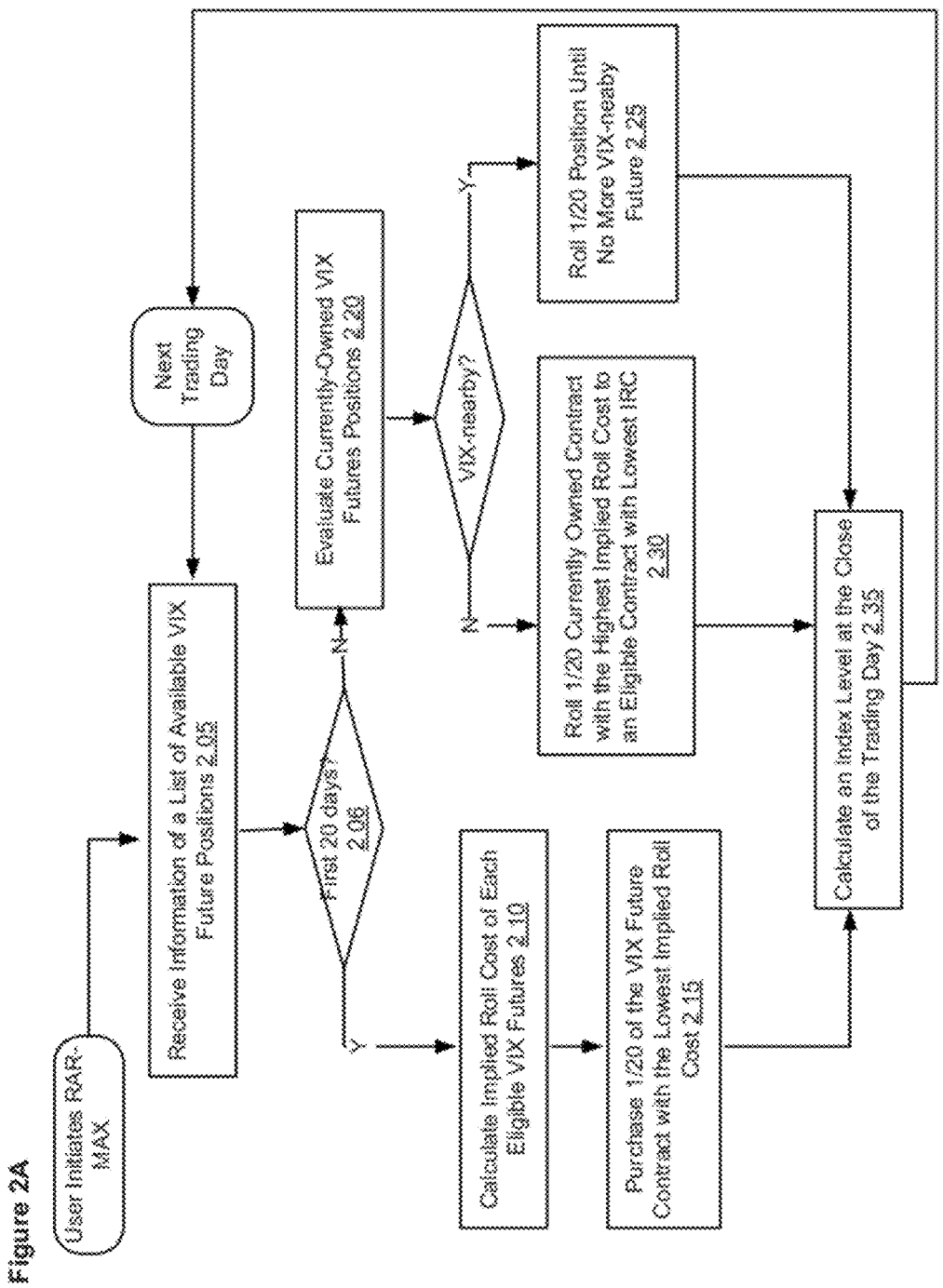
FIGS. 2A-2B are of logic flow diagrams illustrating volatility hedging procedures within some embodiments of the RAR-MAX.

FIG. 2A provides an overall logic flow diagram illustrating rolling strategies in one embodiment of RAR-MAX. In one embodiment, RAR-MAX may develop and execute trading strategies to reflect the performance of buying futures contracts based on implied volatility, e.g., the Chicago Board Options Exchange Market Volatility Index (hereinafter "VIX") future contracts. For example, in one implementation, RAR-MAX may execute a strategy which rolls 1/20 of the currently available VIX futures position into the VIX Futures contract with the lowest implied roll cost on a daily basis, subject to a roll cost-benefit rule. In this example, the level of the RAR-MAX strategy at the end of a period may be calculated as the sum of (1) the strategy level at the start of the period, (2) the payoff of the VIX futures trades.

As shown in FIG. 2A, a user may initiate RAR-MAX at the start of a trading period (e.g., 3 months, 6 months, etc.). In one embodiment, RAR-MAX may receive information of a list of available VIX future contracts 205 from a financial data service terminal, e.g., Bloomberg data center, etc. For example, in one implementation, RAR-MAX may download a list of posted future contracts data everyday at 9:45 a.m. NY time, based on the VIX <INDEX> <CT> <GO> page on Bloomberg.

In one embodiment, the RAR-MAX may determine a trading strategy based on the timing. In one implementation, during the initial period of the trading period, RAR-MAX may purchase eligible future contracts from the public trade platform, e.g., the listing VIX futures on CBOE For example, for the first 20 trading days 206 of the trading period, RAR-MAX may calculate the implied roll cost of each listed eligible future contact 210; and purchase 1/20th of the VIX futures position of the cheapest eligible contract based on the implied roll cost on a daily basis for the first 20 days of the trading period 215. In an alternative implementation, RAR-MAX may select a rolling contract on a daily basis, e.g., everyday at 9:45 a.m. NY time, choosing the cheapest eligible contract based on the VIX <INDEX> <CT> <GO> page on Bloomberg. For example, eligible contracts may be the 2nd-nearby to 7th-nearby listed VIX futures contracts.

In one embodiment, RAR-MAX may calculate an implied roll cost associated with the rolling. For example, in one implementation, RAR-MAX may calculate the implied roll cost as the difference in the mid level of a VIX contract with the mid level of the VIX contract expiring one month prior as of 9:45 a.m. NY Time on the VIX <INDEX> <CT> <GO> page on Bloomberg as the implied roll cost. For another example, for the 4th nearby contract, the implied roll cost may be calculated as the difference in the 4th nearby contract mid level and the 3rd nearby contract mid level. In one implementation, the respective mid level may be the average of the respective bid and ask levels.

For another example, in one implementation, RAR-MAX may calculate the index excess return to track the performance of the rolling of the VIX futures, which may be calculated according to a formula similar to:

$$\text{Index}ER_t = \text{Index}ER_{t-1} \cdot (1+R_t)$$

Where $R_t$ is the return of a portfolio of futures at Date t.

In one implementation, RAR-MAX may calculate a portfolio value of futures by portfolio value (before rebalance)=$\Sigma_{j=2}^{7} n_{j,t-1} \cdot p_{j,t}$, where $n_{j,TIME,t}$ is the number of future contracts of j, at time TIME, and Date t, and $p_{j,TYPE,TIME,t}$ be the price of future contract j, at time TIME, and Date t; TYPE may be BID, ASK or MID, eligible future contracts may be selected between 2 to 7. In one example, RAR-MAX may calculate an implied roll cost=$IC_{j,TIME,t}=p_{j,TYPE,TIME,t}-p_{j-1,TYPE,TIME,t}$.

In another embodiment, if after the initial purchasing period, e.g., after the 20th trading day 206, on each trading day, RAR-MAX may evaluate the currently owned VIX future contracts 220 and select a daily rolling contract. In one implementation, if any currently-owned VIX Futures contracts become the nearby-VIX Future (e.g., close to termination date), the daily rolling contract may be 1/20th of the overall position may be rolled each day until no more nearby-VIX Future contracts are held 225. If not, RAR-MAX may roll 1/20th of the VIX futures position from the currently owned-contract with the highest implied roll cost to an eligible contract with the lowest implied roll cost as determined at 9:45 a.m. NY time 230, subject to the eligible contracts and subject to a roll cost-benefit rule as discussed below.

In one implementation, the rolling may take place on a daily basis according to a roll cost-benefit rule based on the implied roll cost. For example, in one implementation, if a portion of the VIX future position is the nearby-VIX future contracts, 1/20th of the overall position may be rolled from the nearby-VIX Future contract until there is no nearby-VIX future contacts in the current portfolio. In an alternative implementation, RAR-MAX may roll 1/20th of the overall position if the difference in the implied roll costs is greater than 0.50 points of the currently owned-VIX futures contract. For another example, if the currently owned-contract with the highest implied roll cost has an implied roll cost of 2 points and the contract with the lowest implied roll cost has an implied roll cost of 1.6 points, then the contract may not be rolled on that day.

In one embodiment, RAR-MAX may calculate the index level 235, which may observe the final traded level of the futures as of the close of each day. For example, in one implementation, on the first rolling date, the index level may be calculated as (notional amount+the sum of the mark-to-market of the VIX futures contract outstanding); and on each subsequent daily VIX futures rolling date, the index level may be calculated as (previous strategy level+VIX futures payoff from the ½0th notional that is rolled+the sum of the mark-to-market of the VIX futures contracts outstanding).

Figure 2B:
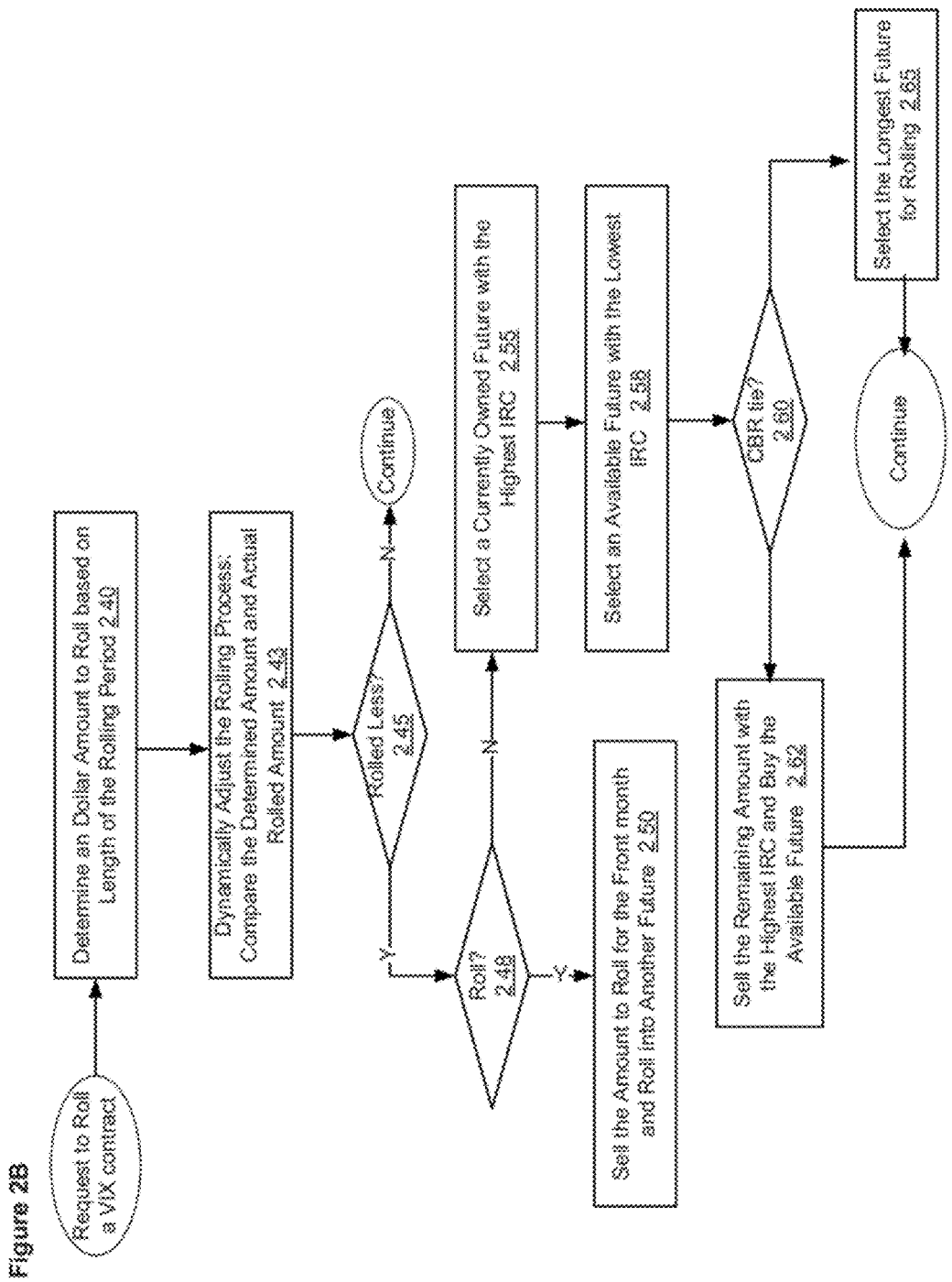

FIG. 2B provides a logic flow illustrating determining a rolling amount within embodiments of the RAR-MAX. In one implementation, RAR-MAX may determine the amount to roll (in dollars) 24o based on the length of the rolling period. For example, in one implementation, if dt is the number of business days in current roll period, beginning and including the settlement date and ending and including the last trading date, the amount to roll may be calculated as $\xi$ of portfolio value, where $$\xi = \frac{1}{dt}.$$

In one implementation, RAR-MAX may dynamically adjust the rolling process 243 by comparing the calculated dollar amount to roll at 240 with the actual rolled amount. When the actual rolled amount is less than the calculated amount 245, the RAR-MAX may elect to keep rolling 248. For example, during the rolling period, if the amount rolled by RAR-MAX is less 245 than the calculated amount to roll, RAR-MAX may sell an up to the amount to roll of the front month future and roll into another future 262, e.g., a future with the lowest implied roll cost. In another implementation, RAR-MAX may alternatively sell the remaining amount to roll from currently owned futures with the highest implied roll cost and buy the cheapest available future, e.g., with the lowest implied roll cost, which satisfies the cost benefit rule.

For example, the RAR-MAX may select a currently owned future with the highest implied roll cost 255, and an available future with the lowest implied roll cost 258; and then determine whether the selected futures satisfy the cost benefit rule. For example, the cost benefit rule may be expressed as:

$$\max\{IC_k\} - \min\{IC_j\} > \zeta$$

where $IC_k$ denotes the implied roll cost of currently owned contracts if the contract is a k-th nearby contract, and $\zeta$ denotes the minimum threshold (e.g., 0.5 point). In this example, if there is a tie in the roll cost-benefit rule evaluation 260, RAR-MAX may select the longest future in the current portfolio for rolling 265.

For example, in one implementation, Tables 1-8 provides an illustrative example of a portfolio of future contract and roll data over a trading period, such as, but not limited to the associated implied roll cost, the contract volume to be rolled over, and/or the like. In one implementation, FIG. 4F provides a data plot illustrating the overall portfolio value over the trading period. It is to be noted that the data, figures and plots in Tables 1-8 and FIG. 4F are for illustrative purpose only.

TABLE 1

Example Implied Roll Cost

| Date | Trading Days | Count | % to Roll | Price 2 | 3 | 4 | 5 | 6 | 7 | Implied Roll Cost 3 | 4 | 5 | 6 | 7 |
|---|---|---|---|---|---|---|---|---|---|---|---|---|---|---|
| 6/16 | 155 | 1 | 0.65% | 19.22 | 19.82 | 21.04 | 20.06 | 20.65 | 21.25 | 0.60 | 1.22 | −0.98 | 0.59 | 0.60 |
| 6/17 | 155 | 2 | 0.65% | 19.17 | 19.82 | 21.04 | 20.04 | 20.65 | 21.25 | 0.65 | 1.22 | −1.00 | 0.61 | 0.60 |
| 6/18 | 155 | 3 | 0.65% | 19.18 | 19.82 | 21.04 | 20.04 | 20.65 | 21.25 | 0.64 | 1.22 | −1.00 | 0.61 | 0.60 |
| 6/21 | 155 | 4 | 0.65% | 19.12 | 19.82 | 21.04 | 20.1 | 20.65 | 20.05 | 0.70 | 1.22 | −0.94 | 0.55 | −0.60 |
| 6/22 | 155 | 5 | 0.65% | 18.68 | 19.82 | 21.04 | 19.77 | 20.65 | 20.01 | 1.14 | 1.22 | −1.27 | 0.88 | −0.64 |

TABLE 2

Cost Benefit Rule

| Date | Min IRC | Max IRC | Max-Min | 1 | 2 | 3 | 4 | 5 |
|---|---|---|---|---|---|---|---|---|
| 6/16 | −0.98 | 1.22 | 2.20 | 1 | | | 4 | 5 |
| 6/17 | −1.00 | 1.22 | 2.22 | 1 | | | 4 | 5 |
| 6/18 | −1.00 | 1.22 | 2.22 | 1 | | | 4 | 5 |
| 6/21 | −0.94 | 1.22 | 2.16 | 1 | | | 4 | 5 |
| 6/22 | −1.27 | 1.22 | 2.49 | 1 | | | 4 | 5 |

TABLE 3

Contract to Roll

| Date | Number of Contracts 2 | 3 | 4 | 5 | 6 | 7 | Value 2 | 3 | 4 | 5 | 6 | 7 | Market Value | To Roll |
|---|---|---|---|---|---|---|---|---|---|---|---|---|---|---|
| 6/16 | 2.00 | 3.00 | 4.00 | 5.00 | 6.00 | 7.00 | 38.44 | 59.46 | 84.16 | 100.30 | 123.90 | 148.75 | 555.01 | 3.58 |
| 6/17 | 1.81 | 3.00 | 4.00 | 5.18 | 6.00 | 7.00 | 34.77 | 59.46 | 84.16 | 103.78 | 123.90 | 148.75 | 554.82 | 3.58 |
| 6/18 | 1.63 | 3.00 | 4.00 | 5.36 | 6.00 | 7.00 | 31.21 | 59.46 | 84.16 | 107.36 | 123.90 | 148.75 | 554.83 | 3.58 |
| 6/21 | 1.44 | 3.00 | 4.00 | 5.54 | 6.00 | 7.00 | 27.54 | 59.46 | 84.16 | 111.27 | 123.90 | 140.35 | 546.68 | 3.53 |
| 6/22 | 1.26 | 3.00 | 4.00 | 5.71 | 6.00 | 7.00 | 23.46 | 59.46 | 84.16 | 112.91 | 123.90 | 140.07 | 543.96 | 3.51 |

TABLE 4

Contract Sort by Priority

| | Price sort by Priority | | | | | | # Contracts Sort by Priority | | | | | |
|---|---|---|---|---|---|---|---|---|---|---|---|---|
| Date | A | B | C | D | E | F | A | B | C | D | E | F |
| 6/16 | 19.22 | 21.04 | 19.82 | 21.25 | 20.65 | 20.06 | 2.00 | 4.00 | 3.00 | 7.00 | 6.00 | 5.00 |
| 6/17 | 19.17 | 21.04 | 19.82 | 20.65 | 21.25 | 20.04 | 1.81 | 4.00 | 3.00 | 6.00 | 7.00 | 5.18 |
| 6/18 | 19.18 | 21.04 | 19.82 | 20.65 | 21.25 | 20.04 | 1.63 | 4.00 | 3.00 | 6.00 | 7.00 | 5.36 |
| 6/21 | 19.12 | 21.04 | 19.82 | 20.65 | 20.05 | 20.1 | 1.44 | 4.00 | 3.00 | 6.00 | 7.00 | 5.54 |
| 6/22 | 18.68 | 21.04 | 19.82 | 20.65 | 20.01 | 19.77 | 1.26 | 4.00 | 3.00 | 6.00 | 7.00 | 5.71 |

TABLE 5

Priority to Roll

| | Priority to Roll | | | | | | Accumulated | | | | | |
|---|---|---|---|---|---|---|---|---|---|---|---|---|
| Date | A | B | C | D | E | F | A | B | C | D | E | F |
| 6/16 | 38.44 | 84.16 | 59.46 | 148.75 | 123.90 | 100.30 | 38.44 | 122.60 | 182.06 | 330.81 | 454.71 | 555.01 |
| 6/17 | 34.77 | 84.16 | 59.46 | 123.90 | 148.75 | 103.78 | 34.77 | 118.93 | 178.39 | 302.29 | 451.04 | 554.82 |
| 6/18 | 31.21 | 84.16 | 59.46 | 123.90 | 148.75 | 107.36 | 31.21 | 115.37 | 174.83 | 298.73 | 447.48 | 554.83 |
| 6/21 | 27.54 | 84.16 | 59.46 | 123.90 | 140.35 | 111.27 | 27.54 | 111.70 | 171.16 | 295.06 | 435.41 | 546.68 |
| 6/22 | 23.46 | 84.16 | 59.46 | 123.90 | 140.07 | 112.91 | 23.46 | 107.62 | 167.08 | 290.98 | 431.05 | 543.96 |

TABLE 6

Not Rolled Over

| | Used | | | | | | If not Rolled Over | | | | | |
|---|---|---|---|---|---|---|---|---|---|---|---|---|
| Date | A | B | C | D | E | F | A | B | C | D | E | F |
| 6/16 | 3.58 | 0.00 | 0.00 | 0.00 | 0.00 | 0.00 | 3.58 | 0.00 | 0.00 | 0.00 | 0.00 | 0.00 |
| 6/17 | 3.58 | 0.00 | 0.00 | 0.00 | 0.00 | 0.00 | 3.58 | 0.00 | 0.00 | 0.00 | 0.00 | 0.00 |
| 6/18 | 3.58 | 0.00 | 0.00 | 0.00 | 0.00 | 0.00 | 3.58 | 0.00 | 0.00 | 0.00 | 0.00 | 0.00 |
| 6/21 | 3.53 | 0.00 | 0.00 | 0.00 | 0.00 | 0.00 | 3.53 | 0.00 | 0.00 | 0.00 | 0.00 | 0.00 |
| 6/22 | 3.51 | 0.00 | 0.00 | 0.00 | 0.00 | 0.00 | 3.51 | 0.00 | 0.00 | 0.00 | 0.00 | 0.00 |

TABLE 7

Amount to Buy

| | Num Titles Sold | | | | | | Amount Sold | Amount To Buy | Amount Bought | Number of Contracts (by Priority) | | | | | |
|---|---|---|---|---|---|---|---|---|---|---|---|---|---|---|---|
| Date | A | B | C | D | E | F | | | | A | B | C | D | E | F |
| 6/16 | 0.00 | 0.18 | 0.00 | 0.00 | 0.00 | 0.00 | 3.52 | 5 | 3.52 | 0.00 | 2.57 | 4.00 | 6.00 | 7.00 | 7.31 |
| 6/17 | 0.00 | 0.18 | 0.00 | 0.00 | 0.00 | 0.00 | 3.52 | 5 | 3.52 | 0.00 | 2.39 | 4.00 | 6.00 | 7.00 | 7.48 |
| 6/18 | 0.00 | 0.17 | 0.00 | 0.00 | 0.00 | 0.00 | 3.54 | 5 | 3.54 | 0.00 | 3.83 | 2.39 | 6.00 | 7.00 | 7.66 |
| 6/21 | 0.00 | 0.18 | 0.00 | 0.00 | 0.00 | 0.00 | 3.53 | 5 | 3.53 | 0.00 | 2.21 | 3.83 | 6.00 | 7.00 | 7.84 |
| 6/22 | 0.00 | 0.17 | 0.00 | 0.00 | 0.00 | 0.00 | 3.54 | 5 | 3.54 | 0.00 | 3.66 | 2.21 | 6.00 | 7.00 | 8.01 |

TABLE 8

Portfolio Value

| | Number of Contracts | | | | | Portfolio | Portfolio Value |
| Date | 2 | 3 | 4 | 5 | 6 | 7 | Value | Growth |
| --- | --- | --- | --- | --- | --- | --- | --- | --- |
| 6/16 | 0.00 | 2.57 | 4.00 | 7.31 | 6.00 | 7.00 | 546.32 | 0.08% |
| 6/17 | 0.00 | 2.39 | 4.00 | 7.48 | 6.00 | 7.00 | 546.32 | 0.00% |
| 6/18 | 0.00 | 2.39 | 3.83 | 7.66 | 6.00 | 7.00 | 548.83 | 0.46% |
| 6/21 | 0.00 | 2.21 | 3.83 | 7.84 | 6.00 | 7.00 | 546.90 | −0.35% |
| 6/22 | 0.00 | 2.21 | 3.66 | 8.01 | 6.00 | 7.00 | 549.07 | 0.40% |

Figure 3B:
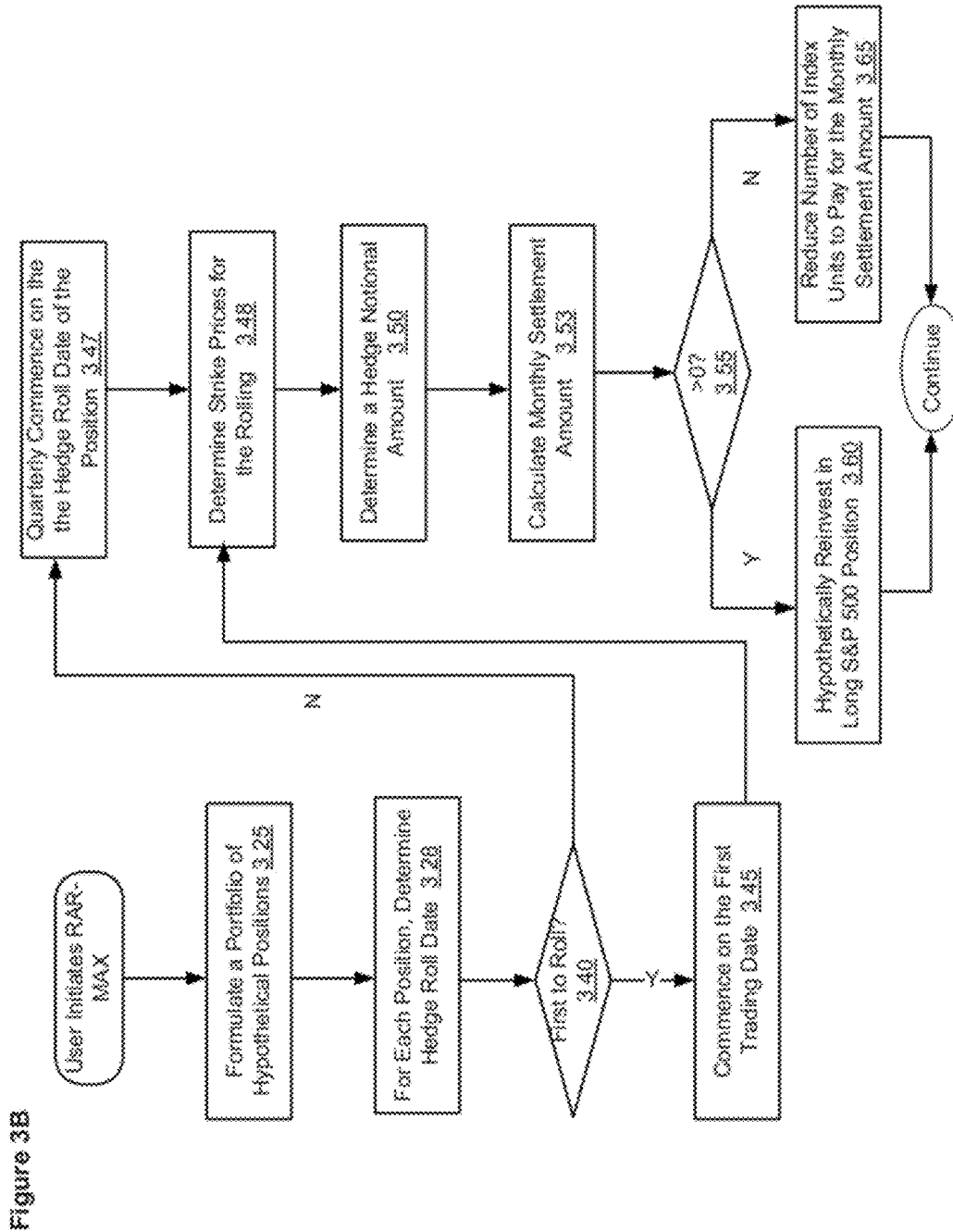

FIGS. 3A and 3B provide a data flow diagram and a logic flow diagram illustrating an equity exposure hedge rolling strategy within embodiments of RAR-MAX. In one embodiment, RAR-MAX may adopt a long total return swap and a portfolio of put spread collar to achieve equity-like returns. For example, in one implementation, RAR-MAX may construct a portfolio of different contract positions, whereby each position may roll a currently owned future contract into a put spread collar at a pre-determined trading day associated with the position.

In one embodiment, as shown in FIG. 3B, RAR-MAX may establish a portfolio including a plurality of hypothetical positions 325. For example, the initial portfolio 302 in FIG. 3A may include three hypothetical positions (each, a "Position"): Position A 305, Position B 310 and Position C 315, each of which may be a hypothetical long position in 1 unit of S&P 500 Index plus a 3-month put spread collar that will roll into a new hypothetical 3-month put spread collar on each hedge roll date for that Position. In one implementation, Position A may commence on the first Position A hedge roll date, Position B will commence on the first Position B hedge roll date, and Position C will commence on the first Position C hedge roll date.

In one implementation, for each position in the formulated portfolio, the RAR-MAX may determine a hedge roll date 328. The RAR-MAX may determine whether the instant position is the first to roll in the portfolio 340. If yes, the position may commence on the first trading date of the trading period 345. If not, the position may be configured to quarterly commence on the hedge roll date of the position 347. For example, in one implementation, for Position A in FIG. 3A, the first Position A hedge roll date may be on a trade date. Following the trade date, Position A may be quarterly starting on the SPX listed options expiry date that is closest to 3 months following the trade date. In one implementation, RAR-MAX may enter into the Position A hedge rolling 308. In one implementation, the expiration for a first Position A put spread collar may be longer or shorter than 3 months.

For Position B hedge roll date, in one implementation, Position B may be quarterly starting on the SPX listed options date that is closest to 1 month following the trade date, on which RAR-MAX may enter into the Position B hedge rolling 313. For Position C hedge roll date, in one implementation, Position C may be quarterly starting on the SPX listed options date that is closest to 2 months following the trade date, on which RAR-MAX may enter into the Position C hedge rolling 318.

In one implementation, the RAR-MAX may determine a plurality of parameters of the rolling put spread collar on each hedge roll date for a position 348. For example, the rolling parameters may include strike prices for an upper strike put, a lower strike put, and a call strike, and/or the like. In one implementation, RAR-MAX may roll an amount of the expiring 3-month put spread collar into a new 3-month put spread collar. In one implementation, the upper strike put of each put spread collar will be the closest listed SPX option that is below 100% of the SPX level as of 4 p.m. NY time; the lower strike put of each put spread collar will be the strike that is closest to a 25-delta 3-month put; and the call strike is the lowest listed strike whose fair value will fully finance the fair value of the put spread.

In one implementation, RAR-MAX may determine the hedge notional amount for each Position for the hedge rolling 35o. For example, the hedge notional amount may be equal to the prevailing notional of the long S&P 500 index upon inception of the hedge.

In one implementation, on each hedge roll date, RAR-MAX may calculate the monthly settlement amount for each position 353, which may be the intrinsic value of the respective put spread collar. In one implementation, if the monthly settlement amount is positive 365, then the hypothetical proceeds of the put spread collar are hypothetically reinvested in the long S&P 500 position 360, causing the number of index units to grow. If the monthly settlement amount is negative, then the number of index units necessary to pay for the monthly settlement amount is reduced from the long position generating a smaller position going forward 365.

In one embodiment, after a hedge roll date, RAR-MAX may proceed with a next trading cycle (e.g. quarterly) 320 for each position.

Figure 4A:
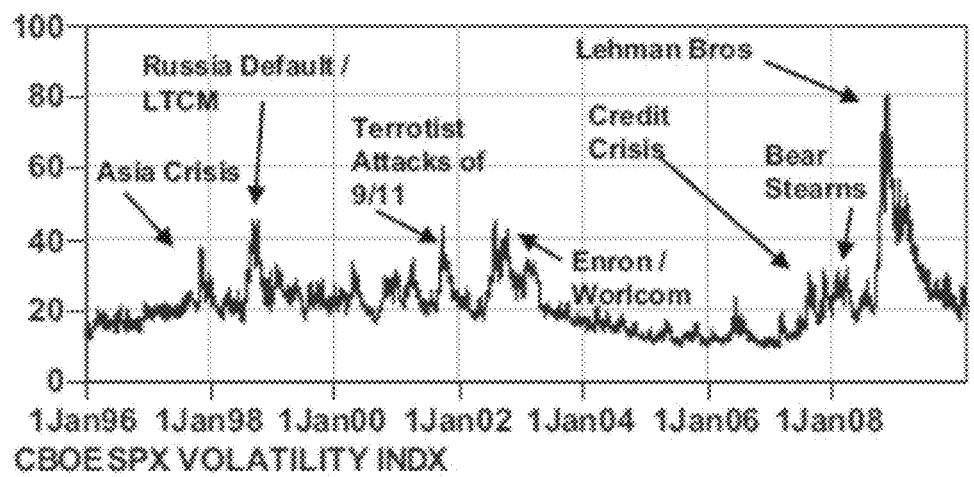
Figure 4A:
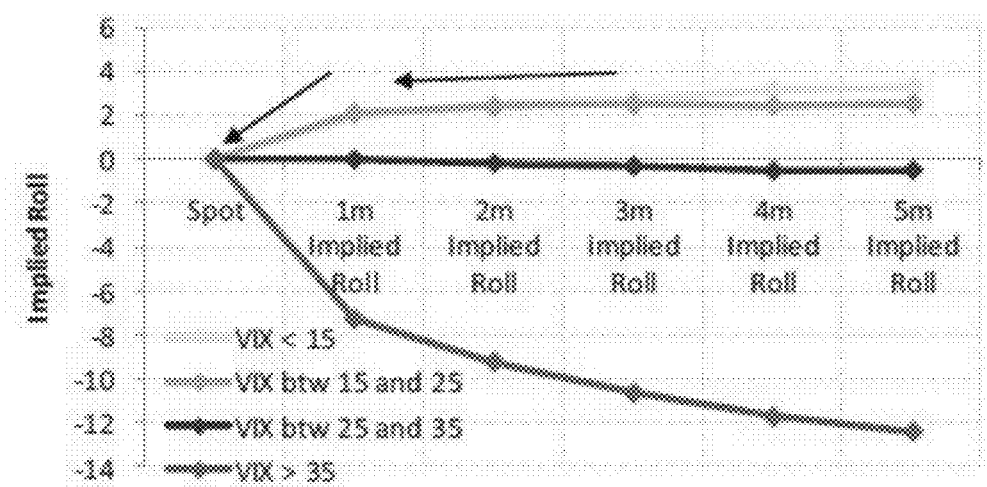
Figure 4B:
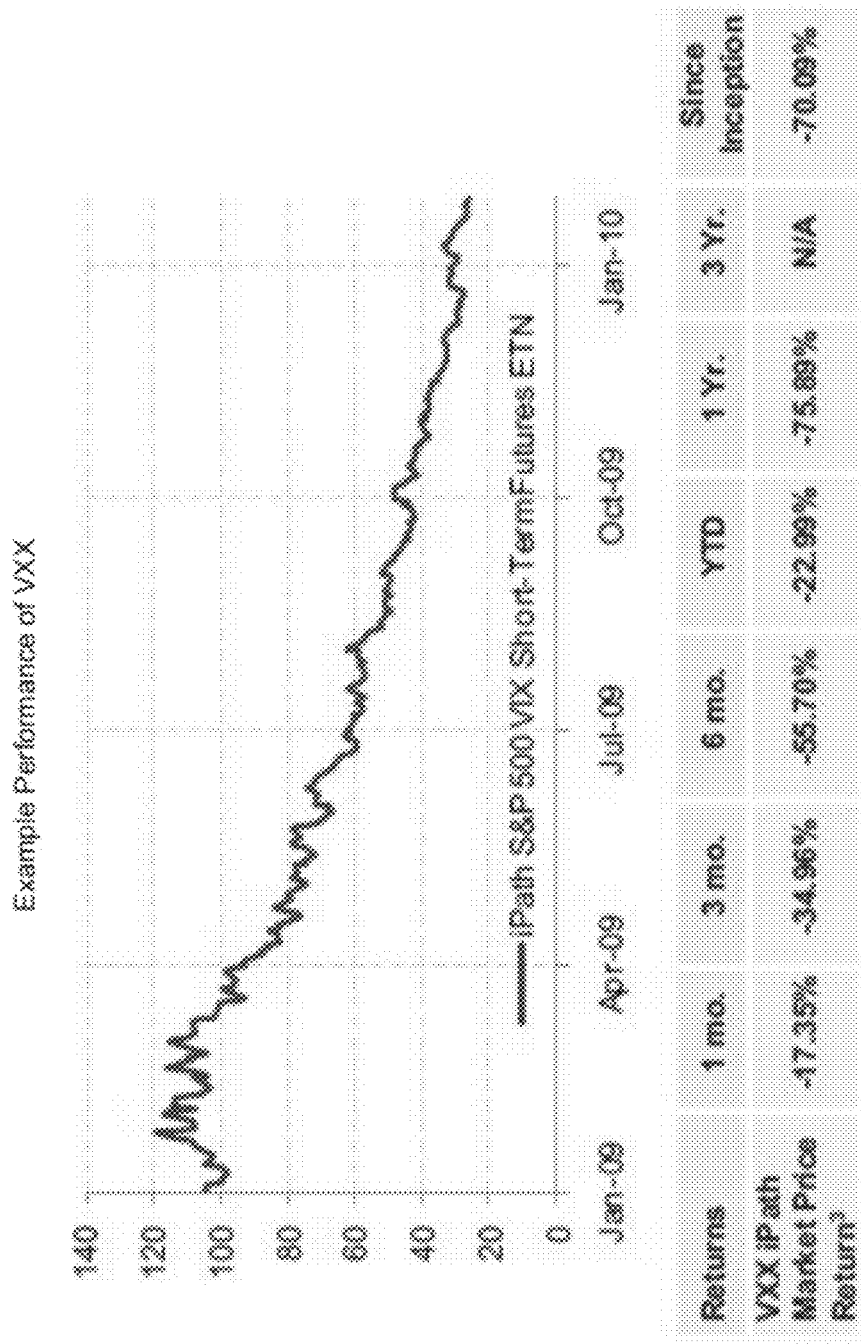

FIGS. 4A-4D provide example performance plots of volatility hedging procedures, as discussed in FIGS. 2A-2B, within embodiments of the RAR-MAX. Graph I of FIG. 4A shows example market data illustrating the historical volatility index level, wherein equity implied volatility may spike at times of market stress and may therefore be considered as an appropriate vehicle for tail risk hedging. As shown in Graph II of FIG. 4A, the average volatility index futures may indicate one of the factors associated in gaining exposure to equity implied volatility is the frequent upward sloping nature of the implied volatility term structure. FIG. 4B shows example performance of rolling volatility index futures, and the VXX iPath market price return during a trading period.

Figure 4C:
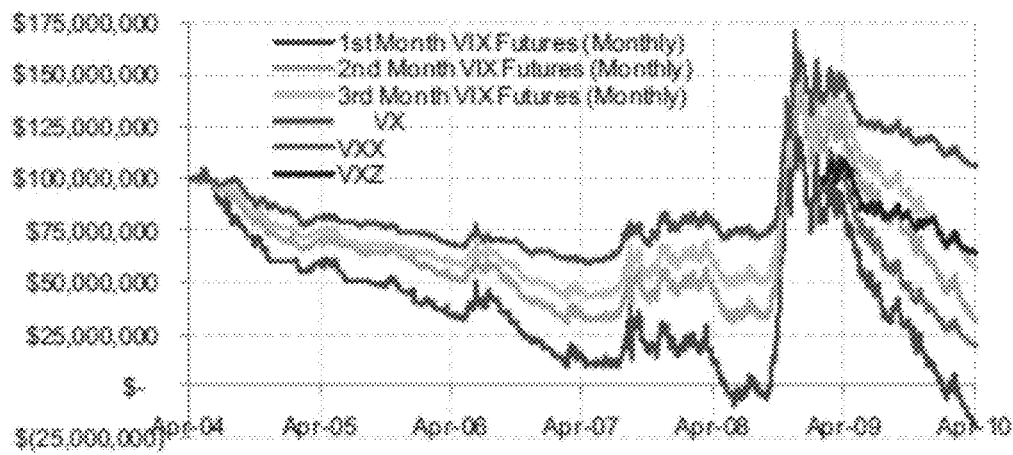
Figure 4C:
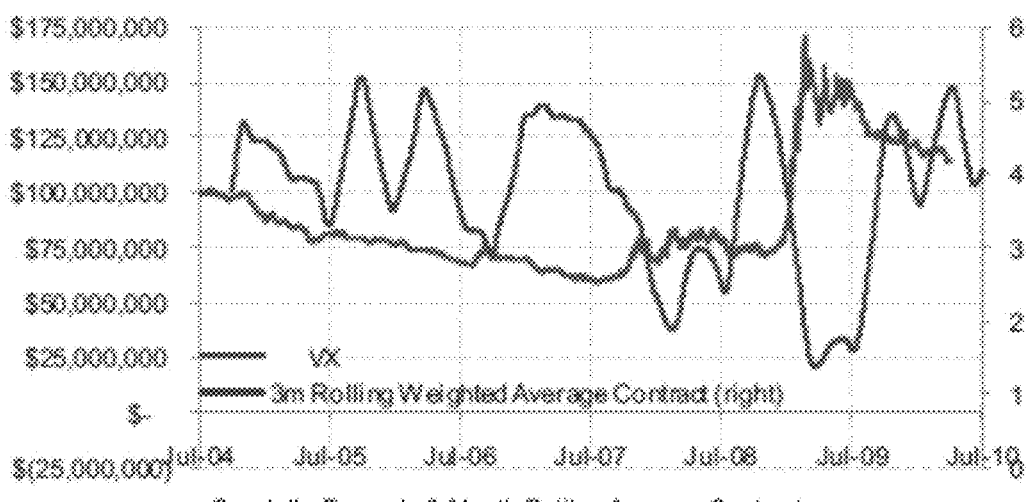

Graph I on FIG. 4C provides example performance comparison of rolling nearby futures and the RAR-MAX volatility hedging. In one implementation, investors may desire to gain exposure to an index that increases when the S&P 500 decreases, similar to how implied volatility has behaved. As shown in Graphs I-II in FIG. 4C, the volatility strategy, which may comprises a proprietary procedure to optimize the selection of the purchased contract to attempt to minimize exposure to the steep nature term structure, may spike during many of the same crises for which the implied volatility spike (as shown in Graph I of FIG. 4A), and its decline during calmer periods is less pronounced than some systematic strategies such as rolling front month futures. In one implementation, if the volatility declines, the return for the investors may not be desirable.

FIG. 4D compares example RAR-MAX volatility futures with forward starting variance swaps within embodiments of the RAR-MAX. Graph I of FIG. 4D shows an example term structure comparison. In one implementation, the CBOE VIX index may be a measure of 30 calendar day volatility of the S&P 500, based on the implied volatility of SPX listed options of the nearest two expiries. Futures contracts trade on the VIX, and expire on the Wednesday that is at least 30 days before the third Friday of the following month. As such, as shown in Graph I of FIG. 4D, the payout of a VIX future is linear based on the settlement value of the VIX.

In another example, forward stating variance swaps may be a type of over-the-counter instruments that may be traded on a variety of underlyers, and may be designed to pay out based on the square of implied volatility at the forward starting date, or to pay out based on the square of realized volatility between the forward starting date and the final expiration date. In one implementation, these swaps may be traded directly, or constructed using spot variance swaps.

For example, when an investor wishes to create a 2 month forward starting month variance swap on $100 k vega, e.g., a 1 month variance swap with observation starting 2 month from the date, the investor may buy $300K vega of a three month variance swap and sell $200K vega of a two month variance swap.

In one implementation, the payoff function of a variance swap is $$P = 100 \times \frac{\sigma^2 - k^2}{2 \times k}$$

wherein σ denotes the volatility level, and k indicates the strike price. and the market convention comprises business days and 252 days per year.

In one implementation, the RAR-MAX may convert a VIX future to variance, as shown in FIG. 4D(2). Within implementations, the RAR-MAX may adjust the VIX future on a calendar/business day:

$$\sigma_{cal} = \sqrt{\sigma_{biz} \times \frac{30}{365.2425} \times \frac{252}{\#bizDays}}$$

wherein $\sigma_{cal}$ represents the volatility of the S&P 500 Index on a calendar day; and $\sigma_{biz}$ represents the volatility of the S&P 500 Index on a business day. In another implementation, the RAR-MAX may adjust the VIX future on a Wednesday/Friday by:

$$\sigma_{Wed} = \sqrt{\frac{2 \times \sigma_{t-1}^2 + \#daysContract_2 \times \sigma_t^2}{2 + \#daysContract_2}}$$

and the convexity of the index may be calculated as:

$$\sigma_{Vol} = \sigma_{var} - \frac{\text{var}[\sigma_{var}^2]}{8[\sigma_{var}^2]^{\frac{3}{2}}}.$$

Figure 4E:
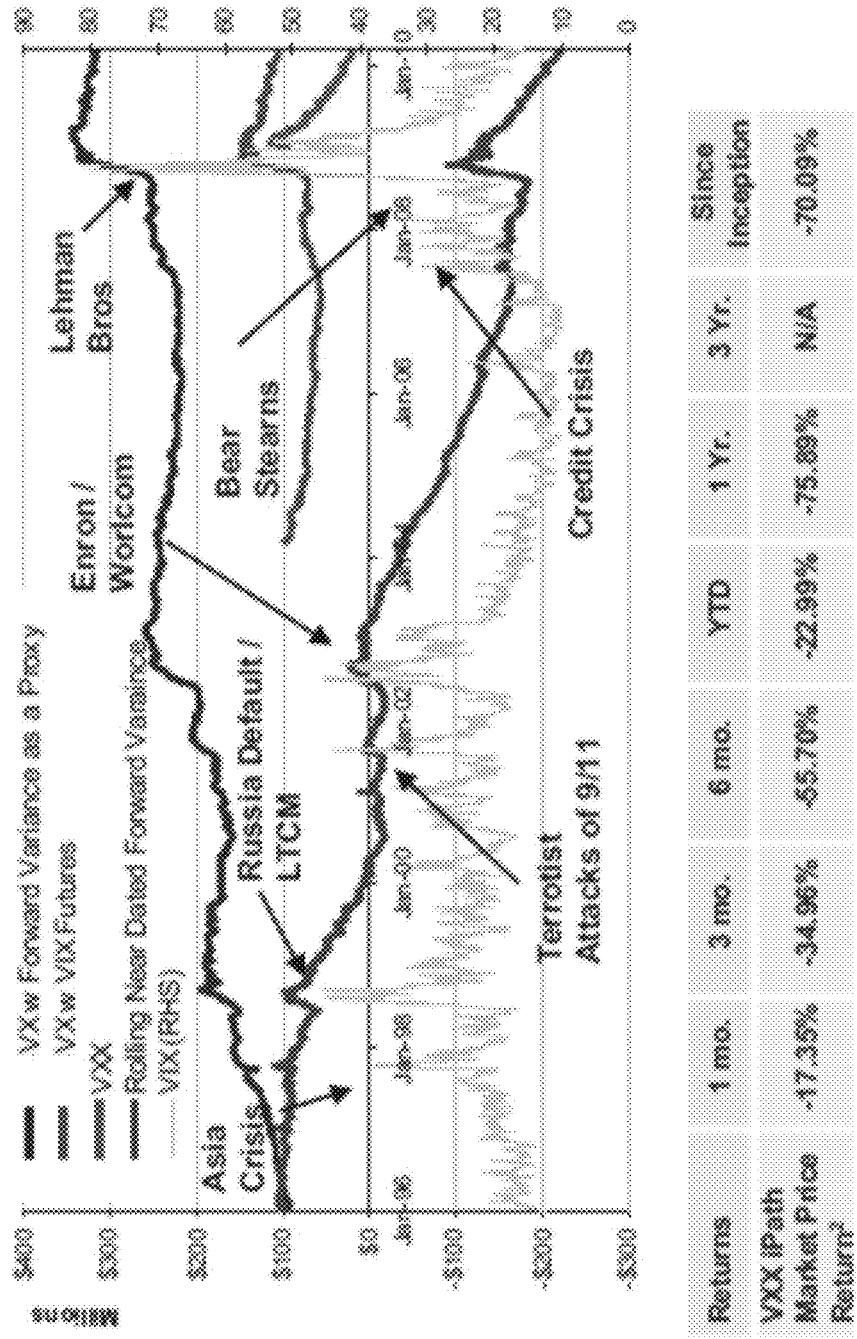
Figure 4F:
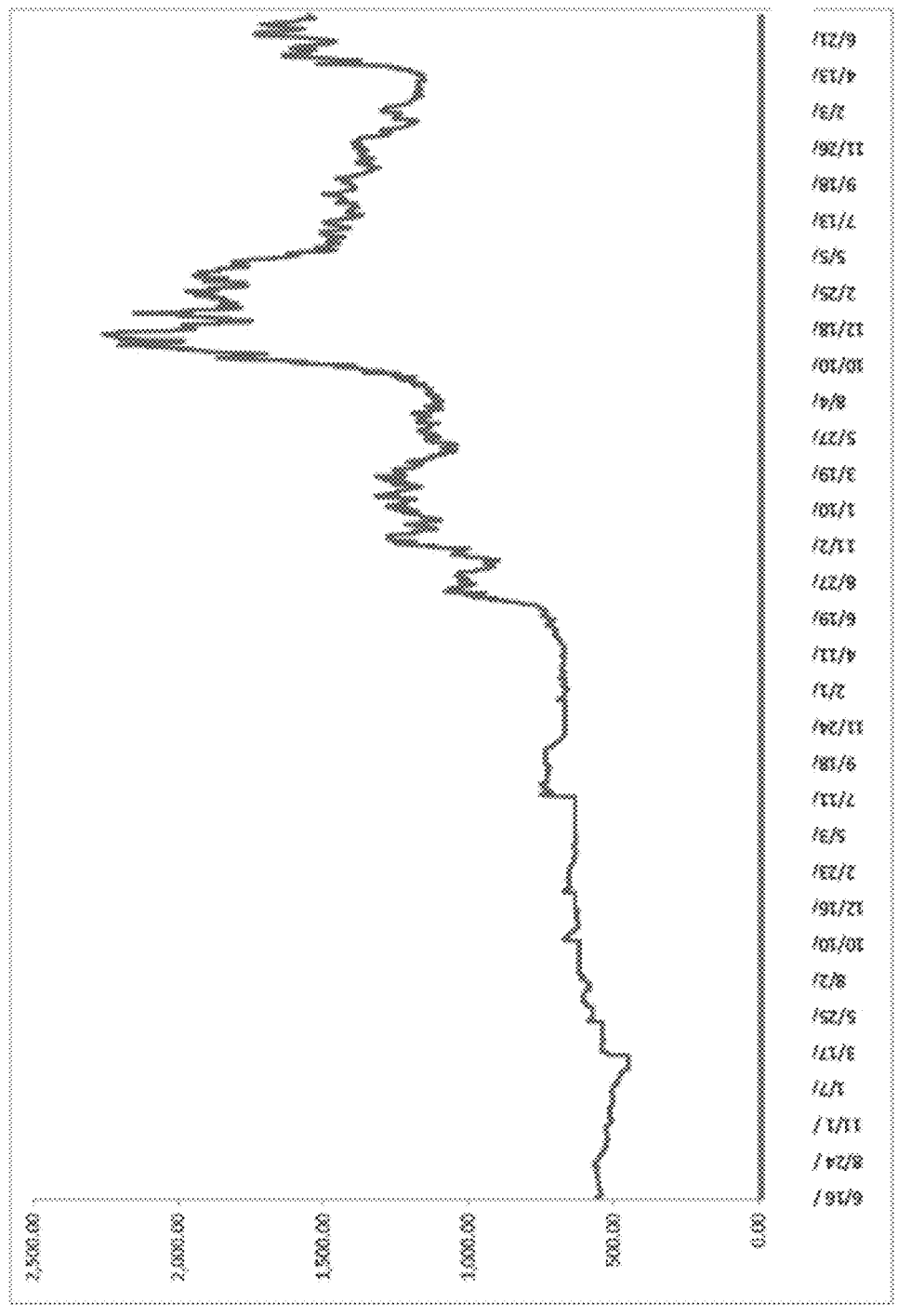

FIG. 4E provides an example performance data plot illustrating VIX historical performance within embodiments of the RAR-MAX. As shown in FIG. 4E, when the forward variance curve (e.g., the blue curve) has performed better than the VIX futures curve (e.g., the green curve) during the time for which data has been available for both, the two curves tend to move together, and both outperform the VXX strategy (e.g., the red curve). The RAR-MAX forward variance strategy may gain value during many of the historical periods of market stress, as shown in the blue curve in FIG. 4E.

FIG. 4F provides exemplary performance data of the RAR-MAX volatility strategy within embodiments of the RAR-MAX. The portfolio value of the RAR-MAX volatility strategy over a one-year trading period is illustrated in FIG. 4F.

Figure 5B:
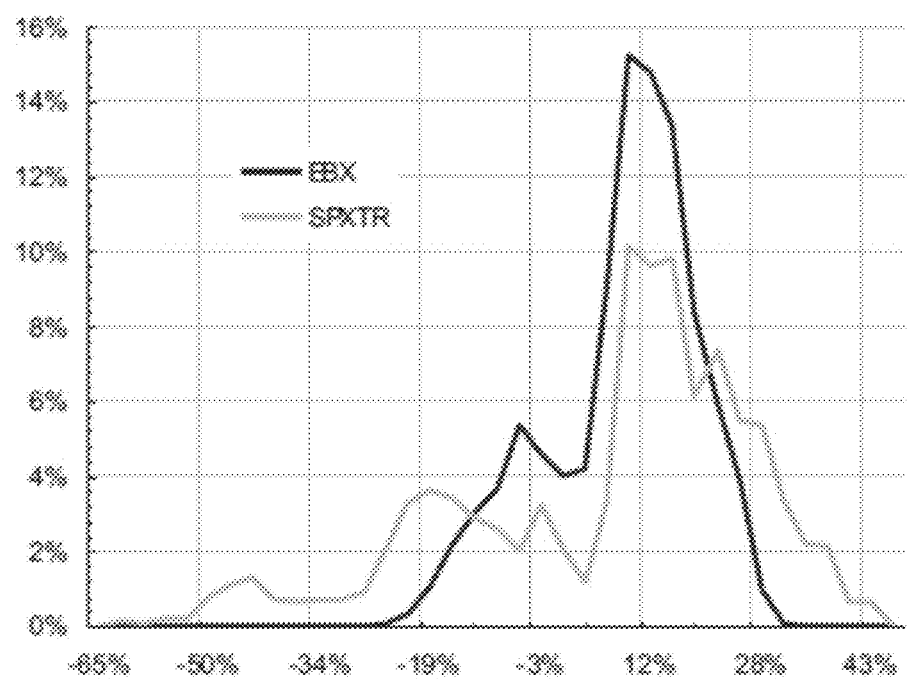
Figure 5C:
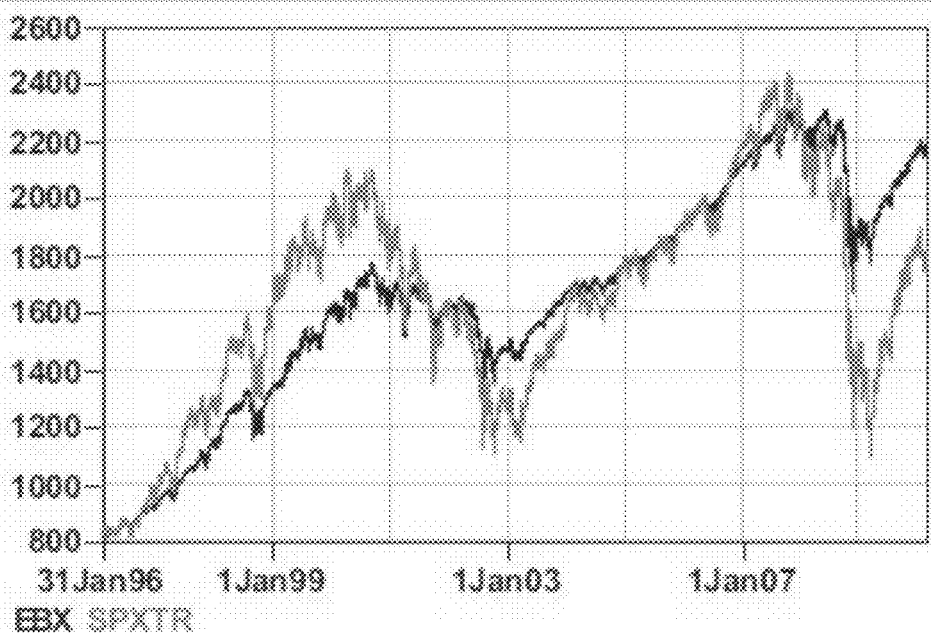

FIGS. 5A-5C provide example performance plots of equity exposure hedging procedures, as discussed in FIGS. 3A-3B, within embodiments of the RAR-MAX. FIG. 5A shows an example analysis of the daily returns of the S&P 500, which indicates that 3 to 5 standard deviation ("sigma") moves occur with higher frequency than that predicted by a normal distribution (e.g., the standard "bell curve"). For example, if excluding the period September 2008 to September 2009, as shown in the first chart in FIG. 5A, there may be 5-sigma events on average every 9.3 years, 4-sigma events occurred on average every 1.7 years, and 3-sigma events occurred on average every 7 months. In another example, if including the period September 2008 to September 2009, as shown in the second chart in FIG. 5A, there may by 6-sigma events occurred on average every 2.8 years, 5-sigma events occurred on average every 1.2 years, 4-sigma events occurred on average every 7 months, and 3-sigma events occurred on average every 3 months. The tail events to the downside may occur more frequently than tail events to the upside (e.g., 52% vs. 48%).

In one implementation, if the equity market followed the normal distribution, there may be 6-sigma events occurred on average every 1,388,468.49 years; 5-sigma events occurred on average every 4,778.04 years; 4-sigma events occurred on average every 43.2 years; and 3-sigma events occurred on average every 1 year.

FIGS. 5B-5C provides example performance data of risk adjusted returns of put spread collars within embodiments of the RAR-MAX. For example, in one implementation, investors may desire to achieve equity-like returns, without some of the volatility and drawdowns observed in indices like the S&P 50. The RAR-MAX may comprise a long total return swap on the S&P 500 and a portfolio of a 3 month put spread collars as an alternative to raw equity exposure. As shown in FIGS. 5B and 5C, compared with the S&P 500 total return index (SPXTR), the RAR-MAX equity exposure strategy may exhibit superior returns across a variety of risk-adjusted metrics, wherein the correlation with SPXTR since 1996 has been 95% with a beta of 0.54.

In one implementation, put spread collars may or may not provide a full hedge to the RAR-MAX portfolio. In another implementation, the put spread collars may hedge a portion of the portfolio when the market falls deeply.

RAR-MAX Controller

Figure 6:
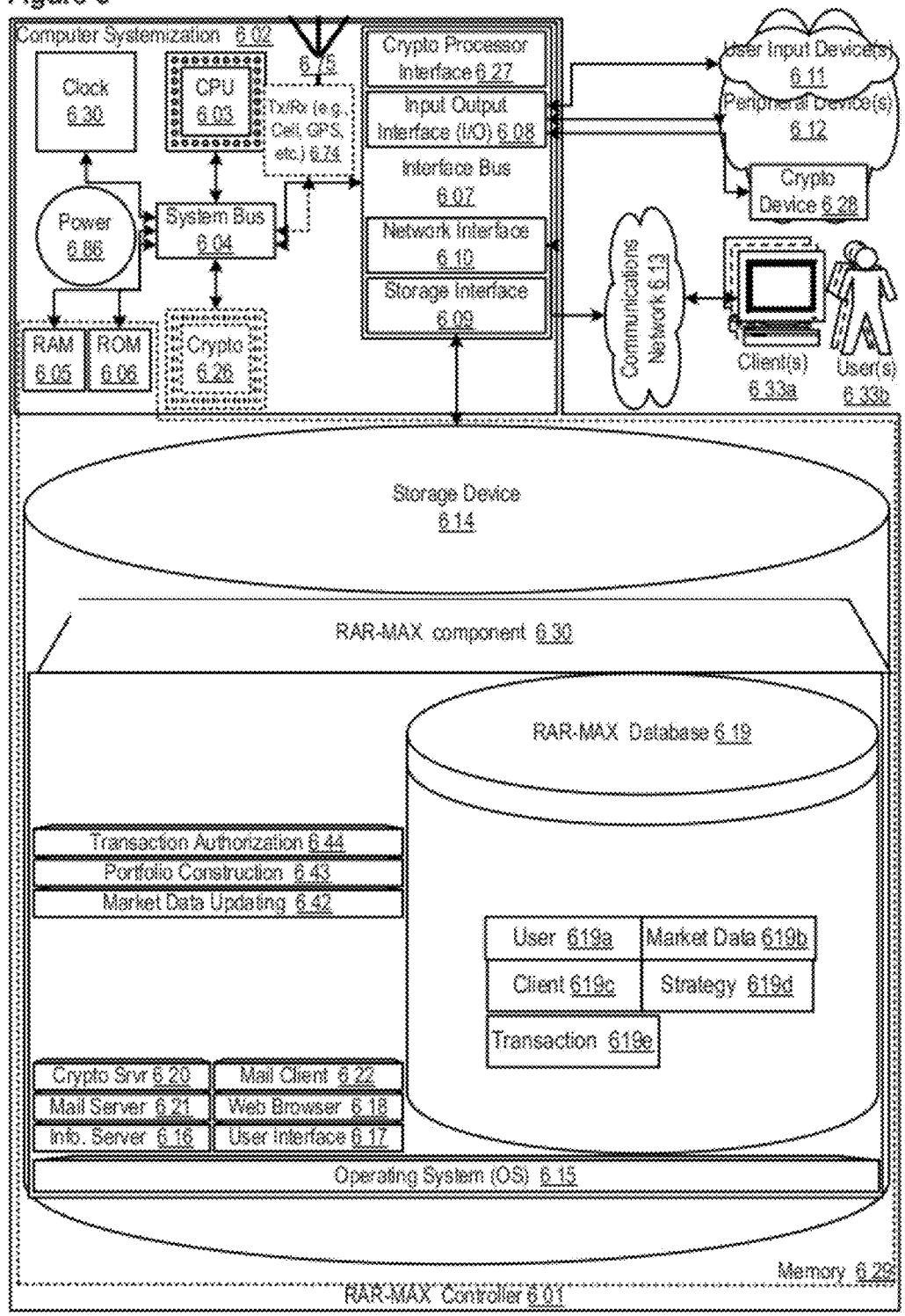
FIG. 6 is of a block diagram illustrating embodiments of the RAR-MAX controller.

FIG. 6 illustrates inventive aspects of a RAR-MAX controller 601 in a block diagram. In this embodiment, the RAR-MAX controller 601 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the RAR-MAX controller 601 may be connected to and/or communicate with entities such as, but not limited to: one or more users from user client devices 611; peripheral devices 612; an optional cryptographic processor device 628; and/or a communications network 613. For example, the RAR-MAX controller 601 may be connected to and/or communicate with users operating client device(s) including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™ etc.), eBook reader(s) (e.g., Amazon Kindle™ etc.), laptop computer(s), notebook(s), netbook(s), gaming console(s) (e.g., XBOX Live™, Nintendo® DS etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks 19 (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RAR-MAX controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effect communications, operations, storage, etc. Optionally, the computer systemization may be connected to an internal power source 686. Optionally, a cryptographic processor 626 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the RAR-MAX controller and beyond through various interfaces.

Should processing requirements dictate a greater amount speed and/or capacity, distributed processors (e.g., Distributed RAR-MAX), mainframe, multi-core, parallel, and/or super-computer architectures may similarly be employed.

Alternatively, should deployment requirements dictate greater portability, smaller Personal Digital Assistants (PDAs) may be employed.

Depending on the particular implementation, features of the RAR-MAX may be achieved by implementing a microcontroller such as CAST's R8051XC2 microcontroller; Intel's MCS 51 (i.e., 8051 microcontroller); and/or the like. Also, to implement certain features of the RAR-MAX, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the RAR-MAX component collection (distributed or otherwise) and/or features may be implemented via the microprocessor and/or via embedded components; e.g., via ASIC, coprocessor, DSP, FPGA, and/or the like. Alternately, some implementations of the RAR-MAX may be implemented with embedded components that are configured and used to achieve a variety of features or signal processing.

Depending on the particular implementation, the embedded components may include software solutions, hardware solutions, and/or some combination of both hardware/software solutions. For example, RAR-MAX features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the RAR-MAX features. A hierarchy of programmable interconnects allow logic blocks to be interconnected as needed by the RAR-MAX system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the RAR-MAX may be developed on regular FPGAs and then migrated into a fixed version that more resembles ASIC implementations. Alternate or coordinating implementations may migrate RAR-MAX controller features to a final ASIC instead of or in addition to FPGAs. Depending on the implementation all of the aforementioned embedded components and microprocessors may be considered the "CPU" and/or "processor" for the RAR-MAX.

Power Source

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the RAR-MAX thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE)1394, fiber channel, Small Computer Systems Interface (SCSI), Universal Serial Bus (USB), and/or the like.

Network interfaces 610 may accept, communicate, and/or connect to a communications network 613. Through a communications network 613, the RAR-MAX controller is accessible through remote clients 633b (e.g., computers with web browsers) by users 633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed RAR-MAX), architectures may similarly be employed to pool, load balance, and/or otherwise increase the communicative bandwidth required by the RAR-MAX controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the RAR-MAX controller may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with the RAR-MAX controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the RAR-MAX controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server); the RAR-MAX component(s) 635; and/or the like (i.e., collectively a component collection). These components may be stored and accessed from the storage devices and/or from storage devices accessible through an interface bus. Although non-conventional program components such as those in the component collection, typically, are stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the RAR-MAX controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RAR-MAX controller to communicate with other entities through a communications network 613. Various communication protocols may be used by the RAR-MAX controller as a subcarrier transport mechanism for interaction, such as, but not limited to: multicast, TCP/IP, UDP, unicast, and/or the like.

Information Server

An information server component 616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the RAR-MAX controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RAR-MAX database 619, operating systems, other program components, user interfaces, Web browsers, and/or the like.

Access to the RAR-MAX database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RAR-MAX. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RAR-MAX as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/15 Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the RAR-MAX enabled nodes. The combined application may be nugatory on systems employing standard Web browsers.

Mail Server

A mail server component 621 is a stored program component that is executed by a CPU 603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the RAR-MAX.

Access to the RAR-MAX mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous 6 (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RAR-MAX may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RAR-MAX component to engage in secure transactions if so desired. The cryptographic component facilitates the secure accessing of resources on the RAR-MAX and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RAR-MAX Database

The RAR-MAX database component 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RAR-MAX database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the RAR-MAX database is implemented as a data-structure, the use of the RAR-MAX database 619 may be integrated into another component such as the RAR-MAX component 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 619 includes several tables 619*a-e*. A user table 619*a* includes fields such as, but not limited to: user_ID, user_password, user_device, user_IP, user_entity, user_project, and/or the like. The user table may support and/oPortr track multiple entity accounts on a RAR-MAX. A Market Data table 619*b* includes fields such as, but not limited to: market_data feed ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. A Client table 619*c* may include fields such as, but not limited to: client_ID, client_name, client_address, client_legalInfo, client_income, client_loan, and/or the like. A Strategy table 619*d* may include fields such as, but not limited to: Strategy_ID, Strategy_instrument, Strategy_term, Strategy_clientID, and/or the like. A transaction table 619*e* may include fields such as, but not limited to TransactionID, TransactionName, TRansactionTime, TransactionDate, TransactionAmount, TransactionInstrument, TransactionType, TransactionDescription, TransactionClientID, TransactionStrategyID, and/or the like. In one embodiment, the RAR-MAX database may interact with other database systems. For example, employing a distributed database system, queries and data access by search RAR-MAX component may treat the combination of the RAR-MAX database, an integrated data security layer database as a single database entity.

In one embodiment, the RAR-MAX database may interact with other database systems. For example, employing a distributed database system, queries and data access by search RAR-MAX component may treat the combination of the RAR-MAX database, an integrated data security layer database as a single database entity.

In one embodiment, user programs may contain various user interface primitives, which may serve to update the RAR-MAX. Also, various accounts may require custom database tables depending upon the environments and the types of clients the RAR-MAX may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619*a-e*. The RAR-MAX may be configured to keep track of various settings, inputs, and parameters via database controllers.

The RAR-MAX database may communicate to and/or with other components in a component collection, including itself, and/or facilities of the like. Most frequently, the RAR-MAX database communicates with the RAR-MAX component, other program components, and/or the like. The database may contain, retain, and provide information regarding other nodes and data.

The RAR-MAXs

The RAR-MAX component 635 is a stored program component that is executed by a CPU. In one embodiment, the RAR-MAX component incorporates any and/or all combinations of the aspects of the RAR-MAX discussed in the previous figures. As such, the RAR-MAX affects accessing, obtaining and the provision of information, services, transactions, and/or the like across various communications networks.

The RAR-MAX component may transform market data inputs via RAR-MAX components into trade execution outputs, and/or the like and use of the RAR-MAX. In one embodiment, the RAR-MAX component 635 takes inputs (e.g., market data 153, client's investment request 108, and/or the like) etc., and transforms the inputs via various components (e.g., market data updating component 642, portfolio construction component 643, transaction authorization component 644, and/or the like), into outputs (e.g., transaction record 126, investment return 127, and/or the like), as shown in FIGS. 1A-6, as well as throughout the specification.

The RAR-MAX component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the RAR-MAX server employs a cryptographic server to encrypt and decrypt communications. The RAR-MAX component may communicate to and/or with other components in a component collection, including itself, and/or facilities of the like. Most frequently, the RAR-MAX component communicates with the RAR-MAX database, operating systems, other program components, and/or the like. The RAR-MAX may contain, communicate, generate, obtain, and/or provide program component, system, user, and/or data communications, requests, and/or responses.

Distributed RAR-MAXs

The structure and/or operation of any of the RAR-MAX node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. For example, RAR-MAX server(s) and database(s) may all be localized within a single computing terminal. As another example, the RAR-MAX components may be localized within one or more entities (e.g., hospitals, pharmaceutical companies etc.) involved in coordinated patient management.

The configuration of the RAR-MAX controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Additional embodiments of RAR-MAX may comprise the following:

1. A volatility exposure risk hedging processor-implemented method, comprising:

retrieving information of an investment portfolio of financial instruments;

receiving market data of a list of one or more eligible financial instrument positions;

determining when the instant trading time is within an initial time period of a trading period;

calculating implied roll costs associated with each of the one or more eligible financial instrument positions upon the determination;

determining a financial instrument position with the lowest implied roll cost based on the calculation of implied roll costs associated with each of the one or more eligible financial instrument positions; and generating a transaction order purchasing a portion of a financial instrument based on the determined financial instrument position with the lowest implied roll cost.

2. The method of embodiment 1, wherein the financial instruments in the investment portfolio comprise future contracts.

3. The method of embodiment 1, wherein the financial instrument positions comprise volatility index future positions.

4. The method of embodiment 1, wherein the market data comprises volatility index data from Chicago Board Options Exchange.

5. The method of embodiment 1, wherein the initial time period of the trading period is the first 20 days of the trading period.

6. The method of embodiment 5, wherein the one or more financial instrument positions is eligible for rolling when the instant trading time is within a fist 20 days of the trading period.

7. The method of embodiment 1, wherein the one or more financial instrument positions is eligible if it is a 2nd-nearby to 7th-nearby volatility index the calculation of implied roll costs.

8. The method of embodiment 1, wherein the implied roll cost is calculated as the difference in a middle level of a first volatility index contract with a middle level of a second volatility contract expiring one month prior.

9. The method of embodiment 1, wherein the portion of the financial instrument is 1/20.

10. The method of embodiment 1, further comprising:
determining the instant trading time is beyond an initial time period of a trading period; and
determining whether there is available nearby volatility index future contract.

11. The method of embodiment 10, further comprising:
rolling a portion of a currently owned contract with the highest implied roll cost to an eligible contract with a lowest implied cost when there is no available nearby volatility index future contract.

12. The method of embodiment 10, further comprising:
rolling a portion of an available nearby volatility index future contract until there is no more nearby volatility index future contract, when there is at least one available nearby volatility index future contract.

13. The method of embodiment 11, wherein the rolling may take place on a daily basis according to a roll cost-benefit rule.

14. The method of embodiment 13, wherein the roll cost benefit rule comprises:
calculating a difference between a highest implied roll cost of the currently owned-contracts and a lowest Implied Roll Cost of available contracts; and
rolling 1/20 of the currently owned contract when the calculated difference is greater than 0.50 points of the currently owned contract.

15. The method of embodiment 1, further comprising:
calculating an index level at close of a trading day.

16. The method of embodiment 15, wherein the index level is calculated on a first rolling date as a predetermined notional amount plus a sum of the mark-to-market of the volatility index futures contract outstanding.

17. The method of embodiment 15, wherein the index level is calculated on a volatility index future rolling date subsequent to a first trading date, as a sum of a previous strategy Level, volatility futures payoff from a 1/20th notional that is rolled, and a sum of the mark-to-market of the volatility index futures contract outstanding.

18. A volatility exposure risk hedging apparatus, comprising:
a memory; and
a processor disposed in communication with the memory and configured to issue processing instructions stored in the memory, wherein the processor issues instructions to:
retrieve information of an investment portfolio of financial instruments;
receive market data of a list of one or more eligible financial instrument positions;
determine when the instant trading time is within an initial time period of a trading period;
calculate implied roll costs associated with each of the one or more eligible financial instrument positions upon the determination;
determine a financial instrument position with the lowest implied roll cost based on the calculation of implied roll costs associated with each of the one or more eligible financial instrument positions; and
generate a transaction order purchasing a portion of a financial instrument based on the determined financial instrument position with the lowest implied roll cost.

19. A volatility exposure risk hedging system, comprising:
means to retrieve information of an investment portfolio of financial instruments;
means to receive market data of a list of one or more eligible financial instrument positions;
means to determine when the instant trading time is within an initial time period of a trading period;
means to calculate implied roll costs associated with each of the one or more eligible financial instrument positions upon the determination;
means to determine a financial instrument position with the lowest implied roll cost based on the calculation of implied roll costs associated with each of the one or more eligible financial instrument positions; and
means to generate a transaction order purchasing a portion of a financial instrument based on the determined financial instrument position with the lowest implied roll cost.

20. A volatility exposure risk hedging processor-readable tangible medium storing processor-issuable instructions to:
retrieve information of an investment portfolio of financial instruments;
receive market data of a list of one or more eligible financial instrument positions;
determine when the instant trading time is within an initial time period of a trading period;
calculate implied roll costs associated with each of the one or more eligible financial instrument positions upon the determination;
determine a financial instrument position with the lowest implied roll cost based on the calculation of implied roll costs associated with each of the one or more eligible financial instrument positions; and
generate a transaction order purchasing a portion of a financial instrument based on the determined financial instrument position with the lowest implied roll cost.

In order to address various issues and improve over the prior art, the invention is directed to APPARATUSES, METHODS AND SYSTEMS FOR A RISK-ADJUSTED RETURN MAXIMIZING INVESTMENT STRUCTURE. The entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs of the RAR-MAX and/or characteristics of the hardware, software, network framework, monetization model and/or the like, various embodiments of the RAR-MAX may be implemented that enable a great deal of flexibility and customization. It is to be understood that, depending on the particular needs of the RAR-MAX and/or characteristics of the hardware, software, network framework, monetization model and/or the like, various embodiments of the RAR-MAX may be implemented that enable a great deal of flexibility and customization. The instant disclosure discusses example implementations of the RAR-MAX within the context of financial investment procedures. However, it is to be understood that the system described herein can be readily configured for a wide range of other applications and/or implementations. For example, implementations of the RAR-MAX can be configured to operate within the context of asset management, and/or the like. It is to be understood that the RAR-MAX may be further adapted to other implementations.

What is claimed is:

1. An equity hedging processor-implemented method, comprising:
   formulating, by a processor, a portfolio of a plurality of contract positions;
   determining, by said processor, hedge roll dates for each contract position in the portfolio;
   determining, by said processor, a first expiring financial instrument on a first hedge roll date;
   determining, by said processor, a first plurality of parameters for a first new financial instrument
   wherein the first plurality of parameters comprises an upper strike put, a lower strike put, and a call strike;
   rolling, by said processor, the first expiring financial instrument to the first new financial instrument associated with the determined first plurality of parameters on the first hedge roll date;
   determining, by said processor, a second expiring financial instrument on a second hedge roll date;
   determining, by said processor, a second plurality of parameters for a second new financial instrument, wherein the second plurality of parameters comprises an upper strike put, a lower strike put, and a call strike; and
   rolling, by said processor, the second expiring financial instrument to the second new financial instrument associated with the determined second plurality of parameters on the second hedge roll date.

2. The method of claim 1, wherein the portfolio comprises three positions.

3. The method of claim 2, wherein each of the three positions is a long position in 1 unit of S&P 500 Index plus a 3-month put spread collar.

4. The method of claim 3, wherein the 3-month put spread collar will roll into a new 3-month put spread collar on a hedge roll date for that position.

5. The method of claim 1, wherein the first expiring financial instrument is a 3-month put spread collar.

6. The method of claim 1, wherein the first hedge roll date quarterly starting on S&P 500 Index listed option expiry date that is closest to 3 months following a predetermined initial trade date.

7. The method of claim 1, wherein the first new financial instrument is a new 3-month put spread collar.

8. The method of claim 1, wherein the upper strike put is determined as the closest listed S&P 500 Index option that is below 100% of the S&P 500 Index level as of 4 p.m. NY time.

9. The method of claim 1, wherein the lower strike put is determined as a strike that is closest to a 25-delta 3-month put.

10. The method of claim 1, wherein the call strike is determined as a lowest listed strike whose fair value will fully finance the fair value of the put spread.

11. The method of claim 1, wherein the second hedge roll date quarterly starting on the S&P 500 Index listed option expiry date that is closest to 1 months following a predetermined initial trade date.

12. The method of claim 1, further comprising:
    determining a third expiring financial instrument on a third hedge roll date;
    determining a third plurality of parameters for a third new financial instrument; and
    rolling the third expiring financial instrument to the third new financial instrument associated with the determined third plurality of rollover parameters on the third hedge roll date.

13. The method of claim 12, wherein the third hedge roll date quarterly starting on the S&P 500 Index listed option expiry date that is closest to 2 months following a predetermined initial trade date.

14. The method of claim 1, further comprising:
    determining a notional amount for each position as a prevailing notional of the long S&P 500 Index upon inception of hedging.

15. The method of claim 1, further comprising:
determining, on each hedge roll date, a monthly settlement amount as an intrinsic value of a rolling put spread collar.

16. The method of claim 15, further comprising:
reinvesting proceeds of the rolling put spread collar in a long S&P 500 Index position, when the monthly settlement amount is greater than zero.

17. An equity hedging apparatus, comprising:
a memory; and
a processor disposed in communication with the memory and configured to issue processing instructions stored in the memory, wherein the processor issues instructions to:
formulate a portfolio of a plurality of contract positions;
determine hedge roll dates for each contract position in the portfolio;
determine a first expiring financial instrument on a first hedge roll date;
determine a first plurality of parameters for a first new financial instrument, wherein the first plurality of parameters comprises an upper strike put, a lower strike put, and a call strike;
roll the first expiring financial instrument to the first new financial instrument associated with the determined first plurality of parameters on the first hedge roll date;
determine a second expiring financial instrument on a second hedge roll date;
determine a second plurality of parameters for a second new financial instrument, wherein the second plurality of parameters comprises an upper strike put, a lower strike put, and a call strike; and
roll the second expiring financial instrument to the second new financial instrument associated with the determined second plurality of parameters on the second hedge roll date.

18. An equity hedging system, comprising:
means for formulating a portfolio of a plurality of contract positions;
means for determining hedge roll dates for each contract position in the portfolio;
means for determining a first expiring financial instrument on a first hedge roll date;
means for determining a first plurality of parameters for a first new financial instrument, wherein the first plurality of parameters comprises an upper strike put, a lower strike put, and a call strike;
means for rolling the first expiring financial instrument to the first new financial instrument associated with the determined first plurality of parameters on the first hedge roll date;
means for determining a second expiring financial instrument on a second hedge roll date;
means for determining a second plurality of parameters for a second new financial instrument, wherein the second plurality of parameters comprises an upper strike put, a lower strike put, and a call strike; and
means for rolling the second expiring financial instrument to the second new financial instrument associated with the determined second plurality of parameters on the second hedge roll date.

19. An equity hedging processor-readable storage medium storing processor-issuable instructions to:
formulate a portfolio of a plurality of contract positions;
determine hedge roll dates for each contract position in the portfolio;
determine a first expiring financial instrument on a first hedge roll date;
determine a first plurality of parameters for a first new financial instrument, wherein the first plurality of parameters comprises an upper strike put, a lower strike put, and a call strike;
roll the first expiring financial instrument to the first new financial instrument associated with the determined first plurality of parameters on the first hedge roll date;
determine a second expiring financial instrument on a second hedge roll date;
determine a second plurality of parameters for a second new financial instrument, wherein the second plurality of parameters comprises an upper strike put, a lower strike put, and a call strike; and
roll the second expiring financial instrument to the second new financial instrument associated with the determined second plurality of parameters on the second hedge roll date.

* * * * *